(12) United States Patent
Miyashita et al.

(10) Patent No.: US 9,987,819 B2
(45) Date of Patent: Jun. 5, 2018

(54) SUPERIMPOSED COMPOSITE INTERIOR COMPONENT

(71) Applicant: TOYODA IRON WORKS CO., LTD., Toyota-shi, Aichi (JP)

(72) Inventors: Osamu Miyashita, Toyota (JP); Hideaki Sakai, Toyota (JP)

(73) Assignee: Toyoda Iron Works Co., Ltd., Toyota-shi, Aichi (JP)

( * ) Notice: Subject to any disclaimer, the term of this patent is extended or adjusted under 35 U.S.C. 154(b) by 0 days. days.

(21) Appl. No.: 15/360,182

(22) Filed: Nov. 23, 2016

(65) Prior Publication Data

US 2017/0165939 A1 Jun. 15, 2017

Related U.S. Application Data

(62) Division of application No. 14/383,164, filed as application No. PCT/JP2012/071602 on Aug. 27, 2012, now Pat. No. 9,764,696.

(30) Foreign Application Priority Data

Mar. 7, 2012 (JP) ................................. 2012-050184

(51) Int. Cl.
*E04C 2/34* (2006.01)
*B32B 3/30* (2006.01)
(Continued)

(52) U.S. Cl.
CPC ............... *B32B 3/30* (2013.01); *B32B 7/045* (2013.01); *B32B 27/08* (2013.01);
(Continued)

(58) Field of Classification Search
CPC .......... B32B 3/30; B32B 7/045; B32B 27/08; B32B 2605/003; B32B 2307/51; B32B 2307/536
(Continued)

(56) References Cited

U.S. PATENT DOCUMENTS 420,656 A 2/1890 Hayes
3,137,602 A 6/1964 Lincoln
(Continued)

FOREIGN PATENT DOCUMENTS

CN 101870275 A 10/2010
CN 201613676 10/2010
(Continued)

OTHER PUBLICATIONS

Office Action issued in European patent application No. 12870500.1 dated Oct. 14, 2016.
(Continued)

*Primary Examiner* — Basil Katcheves
(74) *Attorney, Agent, or Firm* — Finnegan, Henderson, Farabow, Garrett & Dunner LLP

(57) ABSTRACT

A laminated composite interior component includes a first member that has a predetermined mating surface; and a second member made of an elastically deformable resin material. The second member has a plate-shaped portion that is substantially parallel to the mating surface and that has multiple protrusions which are formed integrally with the plate-shaped portion and which protrude toward the mating surface such that a space is formed between the mating surface and the plate-shaped portion. The second member is arranged so as to be laminated on the first member with the protrusions in contact with the mating surface.

5 Claims, 31 Drawing Sheets

(51) Int. Cl.
    *B32B 7/04*    (2006.01)
    *B32B 27/08*   (2006.01)
(52) U.S. Cl.
    CPC ..... *B32B 2307/51* (2013.01); *B32B 2307/536* (2013.01); *B32B 2605/003* (2013.01)
(58) Field of Classification Search
    USPC ........................................ 52/793.1; 296/1.09
    See application file for complete search history.

(56) References Cited

U.S. PATENT DOCUMENTS

| | | | |
|---|---|---|---|
| 3,231,454 | A | 1/1966 | Williams |
| 3,419,457 | A | 12/1968 | Bleasdale |
| 3,834,487 | A | 9/1974 | Hale |
| 4,177,312 | A | 12/1979 | Rasen et al. |
| 4,252,590 | A | 2/1981 | Rasen et al. |
| 4,741,941 | A | 5/1988 | Englebert et al. |
| 4,995,408 | A | 2/1991 | Wallschlaeger |
| 5,030,501 | A | 7/1991 | Colvin et al. |
| 5,374,466 | A | 12/1994 | Bleasdale |
| 5,489,462 | A | 2/1996 | Sieber |
| 5,618,633 | A | 4/1997 | Swanson et al. |
| 5,620,712 | A | 4/1997 | Nishino et al. |
| 7,753,254 | B2 | 7/2010 | Straza |
| 8,734,932 | B2 | 5/2014 | Keene |
| 2001/0041248 | A1 | 11/2001 | Matsushita et al. |
| 2006/0059606 | A1 | 3/2006 | Ferrara |
| 2010/0264680 | A1* | 10/2010 | Ishikawa ............. B60N 2/46 296/1.09 |
| 2011/0135862 | A1 | 6/2011 | Sumi et al. |
| 2011/0250384 | A1 | 10/2011 | Sumi et al. |
| 2011/0303355 | A1 | 12/2011 | Sumi et al. |

FOREIGN PATENT DOCUMENTS

| | | |
|---|---|---|
| EP | 2 243 658 A1 | 10/2010 |
| EP | 2 826 619 A1 | 5/2015 |
| EP | 2 926 986 A1 | 10/2015 |
| EP | 2 930 015 A1 | 10/2015 |
| JP | 56-151549 | 11/1981 |
| JP | 62-129335 | 8/1987 |
| JP | 2-93272 | 7/1990 |
| JP | 3-80807 | 4/1991 |
| JP | 3-52139 | 5/1991 |
| JP | 4-197624 | 7/1992 |
| JP | 4-225035 | 8/1992 |
| JP | 5-293906 | 11/1993 |
| JP | 6-71235 | 10/1994 |
| JP | 7-28632 | 5/1995 |
| JP | 7-117596 | 5/1995 |
| JP | 7-228142 | 8/1995 |
| JP | 10-138377 | 5/1998 |
| JP | 10-140808 | 5/1998 |
| JP | 3069476 | 3/2000 |
| JP | 2000-177468 | 6/2000 |
| JP | 2001-315268 | 11/2001 |
| JP | 2003-103676 | 4/2003 |
| JP | 2003-341405 | 12/2003 |
| JP | 2010-253967 | 11/2010 |
| WO | WO-2012/014166 | 2/2012 |

OTHER PUBLICATIONS

Notification of Reason(s) for Rejection in JP Appln. No. 2014-503411, dated Aug. 5, 2014.
First Office Action dated Aug. 25, 2015, by SIPO of PRC in Chinese patent application No. 201280071180.1.
Office Action dated Sep. 21, 2015, of IPO of Taiwan, ROC in Taiwan patent application No. 102108047.
European Search Report issued in EP Application No. 12870500.1-1303 / 2826619, dated Dec. 2, 2015.
International Search Report in PCT/JP2013/063571, dated Aug. 13, 2013.
International Preliminary Report on Patentability in PCT/JP 2013/063571, dated May 14, 2015.
Office Action issued in Chinese application No. 201380076586.3 dated Jun. 23, 2016.
Office Action issued in Chinese patent application No. 201280071180.1 dated May 6, 2016.
Office Action issued in U.S. Appl. No. 14/891,171 dated Jun. 17, 2016.
Office Action dated Jul. 13, 2017 in Chinese application No. 201280071180.1.
Notice of Allowance and Notice of Allowability issued in U.S. Appl. No. 14/383,164 dated May 17, 2017.
Notice of Allowance and Notice of Allowability issued in U.S. Appl. No. 14/891,171 dated Jun. 12, 2017.
Office Action issued in Chinese patent application No. 201380076586.3 dated Jan. 23, 2017.
Search Report issued in European patent application No. 13884767.8 dated Feb. 13, 2017.
Notice of Allowance issued in U.S. Appl. No. 14/383,164 dated Jan. 31, 2017.
Advisory Action issued in U.S. Appl. No. 14/891,171 dated Mar. 13, 2017.
Office Action issued in Mexican patent application No. MX/a/2014/010715 dated Mar. 3, 2017.
Office Action issued in European Patent Application No. 13884767.8 dated Jan. 10, 2018.

* cited by examiner (a)  (b)

FIG. 34A
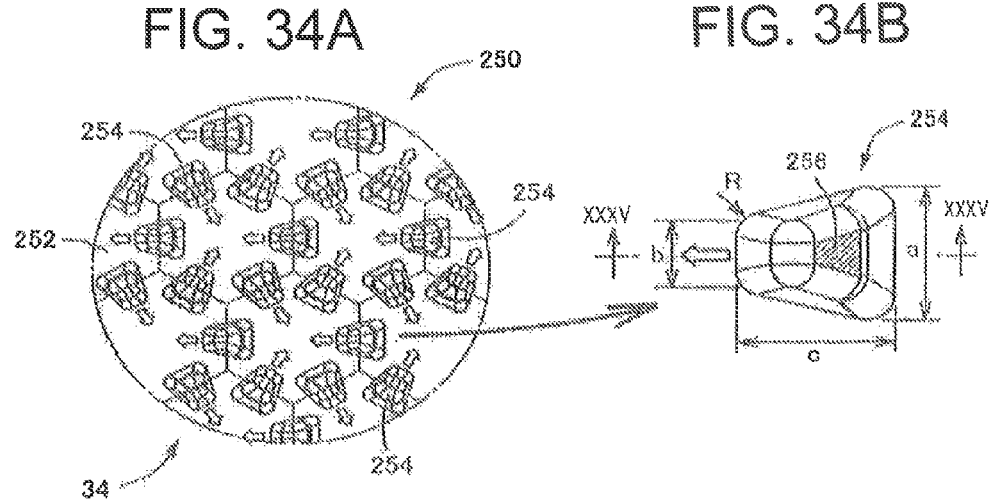
FIG. 34B
FIG. 35
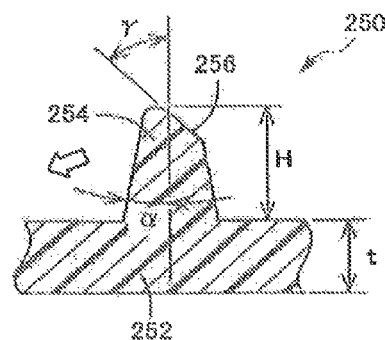
FIG. 36
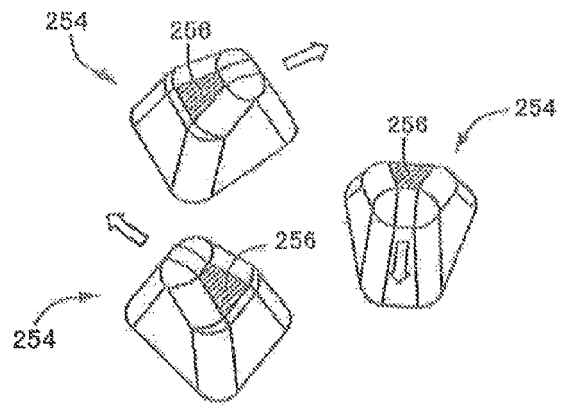

SUPERIMPOSED COMPOSITE INTERIOR COMPONENT

CROSS-REFERENCE TO RELATED APPLICATIONS

This application is a division of application Ser. No. 14/383,164, which is a national phase application of International Application No. PCT/JP2012/071602, filed Aug. 27, 2012, and claims the priority of Japanese Application No. 2012-050184, filed Mar. 7, 2012, the content of each of which is incorporated herein by reference.

TECHNICAL FIELD

The invention relates to a laminated composite interior component, and more specifically to a technique for further improving the feel of a laminated composite interior component to which cushioning characteristics are imparted through elastic deformation of multiple protrusions.

BACKGROUND ART

There is a known laminated composite interior component that includes: (a) a first member that has a predetermined mating surface; and (b) a second member made of an elastically deformable resin material, the second member having a plate-like portion that is substantially parallel to the mating surface and that has multiple protrusions which are formed integrally with plate-like portion and which protrude toward the mating surface such that a space is formed between the mating surface and the plate-like portion, the second member being arranged so as to be laminated on the first member with the protrusions in contact with the mating surface, wherein (c) cushioning characteristics are imparted to the laminated composite interior component when distal ends of the protrusions are pressed against the mating surface and thereby elastically deformed. A component described in Patent Document 1 is an example of the laminated composite interior component, and relates to an interior component (armrest, or the like) for a vehicle. Patent Document 1 describes a technique for improving the feel (soft feel) of an upholstery member, which is the second member, through elastic deformation of multiple pin-shaped protrusions formed on the back face of the upholstery member. Patent Document 1 also describes a technique in which ribs are formed instead of the pin-shaped protrusions.

RELATED ART DOCUMENT

Patent Document

[Patent Document 1] Japanese Patent Application Publication No. 2003-103676

SUMMARY OF THE INVENTION

Problem to be Solved by the Invention

However, in such a conventional laminated composite interior component, simple columnar protrusions are just formed. Therefore, a manner of deformation (bending direction, or the like) at the time when the protrusions are elastically deformed by a pressing load is not stable, which causes a problem that the feel of the laminated composite interior component is likely to vary. When ribs are formed instead of the multiple protrusions, the stiffness becomes high, which makes it difficult to obtain a sufficient soft feel.

The invention is made in light of the above-described circumstances, and it is an object of the invention to further improve the feel of a laminated composite interior component to which cushioning characteristics are imparted through elastic deformation of multiple protrusions.

Means for Solving the Problem

To achieve the object, the first invention provides a laminated composite interior component, including: (a) a first member that has a predetermined mating surface; and (b) a second member made of an elastically deformable resin material, the second member having a plate-like portion that is substantially parallel to the mating surface and that has multiple protrusions which are formed integrally with plate-like portion and which protrude toward the mating surface such that a space is formed between the mating surface and the plate-like portion, the second member being arranged so as to be laminated on the first member with the protrusions in contact with the mating surface, (c) wherein cushioning characteristics are imparted to the laminated composite interior component when distal ends of the protrusions are pressed against the mating surface and elastically deformed, the laminated composite interior component characterized in that (d) the multiple protrusions have the same shape, the plate-like portion is dotted with the multiple protrusions, bending stiffness of each of the protrusions against a compression load (pressing load applied in an axial direction) is anisotropic around an axis of the protrusion, and each of the multiple protrusions is configured to be bent and deformed in a specific direction about its axis, and (e) the multiple protrusions are arranged at such locations as to constitute respective sides of each of multiple polygons so that there is formed a lattice pattern in which each of the sides of each of the multiple polygons overlaps with a corresponding one of the sides of an adjacent one of the polygons.

The second invention provides the laminated composite interior component recited in the first invention, wherein each of the protrusions has an elongate shape in a planar view when viewed from a direction normal to the plate-like portion.

The fourth invention provides the laminated composite interior component recited in the first or second invention, wherein (a) each of the multiple protrusions is configured to be bent and deformed in a certain direction about its axis; (b) the lattice pattern is formed by consecutively repeating polygons having the same quadrangular shape or the same hexagonal shape; and (c) the protrusions are arranged on the respective sides of each of the polygons such that each of the sides has one of the protrusions and a bending direction of each of the protrusions is an inward direction or an outward direction with respect to a corresponding one of the polygons, and the protrusions are arranged in such positions that the bending directions of the protrusions are alternately inverted around a center line of a corresponding one of the polygons.

The fifth invention provides the laminated composite interior component recited in any one of the first, second, and fourth inventions, wherein the lattice pattern is a honeycomb pattern formed by consecutively repeating regular hexagons having a uniform size, the hexagons being used as the polygons.

The sixth invention provides the laminated composite interior component recited in any one of the first, second, fourth, and fifth inventions, wherein each of the protrusions has an asymmetrical shape in a vertical cross section at a specific position around its axis.

The seventh invention provides the laminated composite interior component recited in the sixth invention, wherein one of a pair of side walls of each of the protrusions, the side walls being on respective sides of the protrusion in the vertical cross section, has a largely inclined surface that is inclined inward toward a distal end side of the protrusion by a larger amount than the other side wall.

The eighth invention provides the laminated composite interior component recited in any one of the first, second, fourth, and fifth inventions, wherein a corner shape of a base portion of each of the protrusions, at which the protrusion protrudes from the plate-like portion, varies around the axis of the protrusion.

The ninth invention provides the laminated composite interior component recited in any one of the first, second, fourth, and fifth inventions, wherein material of each of the protrusions varies around the axis of the protrusion.

The tenth invention provides the laminated composite interior component recited in any one of the first, second, fourth to ninth inventions, wherein (a) the laminated composite interior component is a plate-like panel component; (b) the second member is a surface member; (c) the first member is a plate-like base member that is made of a resin material that is harder than the second member; and (d) a surface of the base member functions as the mating surface, and the surface member is arranged so as to be laminated on the surface of the base member and is fixedly fitted to the base member.

The eleventh invention provides the laminated composite interior component recited in the tenth invention, wherein an upholstery member is fixedly bonded to a surface of the plate-like portion of the surface member, the surface being on a side opposite to a side on which the protrusions are formed, to form a three-layer structure including the plate-like base member as a whole.

The twelfth invention provides the laminated composite interior component recited in any one of the first, second, fourth to ninth inventions, wherein (a) the laminated composite interior component is a plate-like panel component; (b) the first member is a plate-like surface member made of an elastically deformable resin material; and (c) the second member is fixedly fitted to a plate-like base member such that a back face of the plate-like portion, the back face being on a side opposite to a side on which the protrusions are formed, is in close contact with the plate-like base member.

The thirteenth invention provides the laminated composite interior component recited in the tenth or eleventh invention, wherein an inlet port for introducing a heat medium that is supplied from an air conditioner into a space between the base member and the surface member is provided in the base member, and the heat medium is supplied into the space.

The fourteenth invention provides the laminated composite interior component recited in the tenth or eleventh invention, wherein (a) the surface member is laminated on the base member so as to hermetically seal the space between the surface member and the base member and is fixedly fitted to the base member; and (b) compressed gas is filled in the space, and the plate-like portion of the surface member is urged by the compressed gas.

Effect of the Invention

In such a laminated composite interior component, the plate-like portion is dotted with the multiple protrusions, and the bending stiffness of each protrusion against a compression load is anisotropic around the axis of the protrusion. Therefore, each protrusion is easily bent and deformed in a specific direction determined by the anisotropy, and the soft feel (cushioning characteristic) improves. In addition, it is possible to control the bending (toppling) direction of each protrusion. Therefore, the deformation manner (bending direction, or the like) at the time when each protrusion is elastically deformed becomes stable, and variations in the feel at the time when the protrusions are pressed with a finger or a hand are suppressed.

Further, the protrusions are arranged at such locations as to form the respective sides of each of multiple polygons such that there is formed the lattice pattern in which multiple polygons are arranged consecutively adjacent to each other. Therefore, the multiple protrusions are formed in a uniform arrangement pattern, and variations in the feel at the time when the protrusions are pressed with a finger or a hand are suppressed. When the positions of the protrusions are offset from each other in accordance with the respective sides in the lattice pattern, the bending directions of the protrusions accordingly vary. Therefore, an appropriate stiff feel (not-excessive soft feel) is obtained because the protrusions support each other. Therefore, it is possible to obtain a further excellent feel due to a combination of the appropriate stiff feel and the soft feel that is obtained through elastic deformation of the protrusions.

The second invention is the case that each protrusion has an elongate shape in a planar view. Because each protrusion is easily bent and deformed in the direction perpendicular to the longitudinal direction and is hard to bend and deform in the longitudinal direction, the deformation manner at the time when each protrusion is elastically deformed becomes stable, and variations in the feel at the time when the protrusions are pressed with a finger or a hand are suppressed. For example, when the shape in a planar view is a simple rectangular shape, the structure of a molding die is simple. As a result, it is possible to reduce the manufacturing cost and form the structure at low cost.

The fourth invention is the case that each of the multiple protrusions is configured to be bent and deformed in a certain direction about its axis. In the lattice pattern that is formed by consecutively repeating polygons having the same quadrangular shape or the same hexagonal shape, the protrusions are arranged on the respective sides of each of the polygons such that each of the sides has one of the protrusions and a bending direction of each of the protrusions is an inward direction or an outward direction with respect to a corresponding one of the polygons, and the protrusions are arranged in such positions that the bending directions of the protrusions are alternately inverted around a center line of a corresponding one of the polygons. Therefore, the deformation manner of the protrusions in the unit of polygon is substantially the same in the entire region regardless of the fact that each protrusion is configured so as to be bent and deformed in a certain direction about its axis. Accordingly, a uniform feel is obtained.

The fifth invention is the case that the lattice pattern that is formed by the multiple protrusions is a honeycomb pattern formed by consecutively repeating regular hexagons having a uniform size, the hexagons being used as the polygons. For example, when the positions of the protrusions are offset from each other by 60° or 120° in accordance with the respective sides in the regular hexagons, the anisotropy of elastic deformation against a pressing load is suppressed in comparison with a square lattice pattern. Therefore, a uniform feel is obtained even against a pressing load applied in an oblique direction.

In the sixth invention, the vertical cross section at a specific position around the axis of each protrusion is an asymmetrical shape. Therefore, each protrusion is always elastically deformed in a uniform deformation manner, variations in the feel are suppressed, and substantially the same feel is stably obtained. In addition, it is possible to control the bending (toppling) direction and the ease in the bending of the protrusions on the basis of the cross section with asymmetrical shape. Therefore, by arranging the protrusions such that the protrusions do not contact each other at the time of bending deformation, it is possible to reliably obtain a predetermined soft feel.

In the seventh invention, one of a pair of side walls, the side walls being on respective sides in the vertical cross section, has a largely inclined surface that is inclined inward by a larger amount than the other side wall. Therefore, each protrusion is easily bent toward the side opposite to the side on which the largely inclined surface is formed. Accordingly, it is possible to further improve the soft feel obtained through elastic deformation of the protrusions. In addition, by controlling the ease in bending each protrusion by changing the angle and range of the inclination of the largely inclined surface, it is possible to easily adjust the soft feel. In addition, it is possible to control the bending direction on the basis of the position at which the largely inclined surface is formed. Therefore, by arranging the protrusions such that the protrusions do not contact each other at the time of bending deformation, the protrusions are arranged as densely as possible. Thus, it is possible to reliably obtain a predetermined soft feel through elastic deformation while suppressing variations in the feel due to presence and absence of the protrusions.

The eighth invention is the case that a corner shape of a base portion of each of the protrusions, at which the protrusion protrudes from the plate-like portion, varies around the axis of the protrusion. Because each protrusion is easily bent and deformed in a specific direction determined by the corner shape, the deformation manner at the time when each protrusion is elastically deformed becomes stable, and variations in the feel at the time when the protrusions are pressed with a finger or a hand are suppressed. In addition, it is possible to control the bending (toppling) direction and the ease in the bending of the protrusions on the basis of variations in the corner shape. Therefore, by arranging the protrusions such that the protrusions do not contact each other at the time of bending deformation, the protrusions are arranged as densely as possible. Thus, it is possible to reliably obtain a predetermined soft feel through elastic deformation while suppressing variations in the feel due to presence and absence of the protrusions.

The ninth invention is the case that material of each of the protrusions varies around the axis of the protrusion. Because each protrusion is easily bent and deformed in a specific direction determined by the material, the deformation manner at the time when each protrusion is elastically deformed becomes stable, and variations in the feel at the time when the protrusions are pressed with a finger or a hand are suppressed. In addition, it is possible to control the bending (toppling) direction and the ease in the bending of the protrusions on the basis of variations in the material. Therefore, by arranging the protrusions such that the protrusions do not contact each other at the time of bending deformation, the protrusions are arranged as densely as possible. Thus, it is possible to reliably obtain a predetermined soft feel through elastic deformation while suppressing variations in the feel due to presence and absence of the protrusions.

The tenth invention is the case that the laminated composite interior component is a plate-like panel component. Therein, the second member is a surface member; the first member is a plate-like base member that is harder than the second member; and the surface member is arranged so as to be laminated on the surface of the base member and is fixedly fitted to the base member. In the thus configured panel component, when the plate-like portion of the surface member is pressed with a finger or a hand, an excellent feel is obtained through elastic deformation of the protrusions of the surface member. Thus, advantageous effects in the first to ninth inventions are appropriately obtained. When the surface member is made up of a two-layer structure having only the first member and the second member, it is possible to suppress the manufacturing cost.

The eleventh invention is the case that an upholstery member is fixedly bonded to the surface member in the panel component recited in the tenth invention. The surface of the plate-like portion, the surface being on the side opposite to the side on which the protrusions are formed is covered with the upholstery member. Therefore, even if there occurs a sink mark, uneven luster, or the like, on the plate-like portion due to the protrusions, the sink mark, uneven luster, or the like, is not exposed to the outside, and damage to the surface member is prevented. Therefore, the range of choices for the resin material of the surface member is broadened, and the flexibility of design in the shape, or the like, of each protrusion in association with the feel increases. Therefore, it is possible to further easily and appropriately adjust the feel.

The twelfth invention is the case that the laminated composite interior component is a plate-like panel component. Therein, the first member is a plate-like surface member made of a soft elastically deformable resin material; and the second member is fixedly fitted to a plate-like base member such that a back face of the plate-like portion, the back face being on a side opposite to a side on which the protrusions are formed, is in close contact with the plate-like base member. In the thus configured panel component, when the surface member (first member) is pressed with a finger or a hand, the back face (mating surface) of the surface member is pressed against the distal ends of the protrusions of the second member. Therefore, an excellent feel is obtained through elastic deformation of the protrusions. Thus, advantageous effects in the first to ninth inventions are appropriately obtained. The second member that has the protrusions is covered with the surface member (first member), and the plate-like portion of the second member is fixed to the base member. Therefore, even when there occurs a sink mark, uneven luster, or the like, on the surface of the plate-like portion, the surface being on the side opposite to the side on which the protrusions are formed, the sink mark, the uneven luster, or the like, is not exposed to the outside. Thus, the range of choices for the resin material of the second member is broadened, and the flexibility of design in the shape, or the like, of each protrusion in association with the feel increases. Therefore, it is possible to further easily and appropriately adjust the feel.

In the thirteenth invention, an inlet port is provided in the base member (first member) and is supplied with a heat medium from an air conditioner into a space between the base member and the surface member (second member). Therefore, it is possible to adjust the temperature by the heat medium, thereby further improving the feel of the plate-like portion of the surface member.

In the fourteenth invention, compressed gas is filled in the space between the base member (first member) and the surface member (second member), and the plate-like portion of the surface member is urged by the compressed gas. Therefore, it is possible to impart an appropriate stiff feel to portions other than the protrusions, thereby further improving the feel.

BRIEF DESCRIPTION OF THE DRAWINGS

FIG. 6A is a plan view that shows the small protrusions in a state where the size of each small protrusion is close to an actual size, and FIG. 6B is an enlarged plan view that shows a portion VIb in FIG. 6A.

FIGS. 34A and 34B show a view that illustrates yet another embodiment of the invention in which each small protrusion has a trapezoidal shape in a planar view and a largely inclined surface is formed on the side on which the long side (lower base) of the trapezoidal shape is present. FIG. 34A is a plan view corresponding to FIG. 6B. FIG. 34B is an enlarged view of one of the small protrusions.

FIG. 35 is a vertical cross-sectional view taken along the line XXXV-XXXV in FIG. 34B.

FIG. 36 is a perspective view of the small protrusions in FIGS. 34A and 34B.

FIG. 37A is a plan view corresponding to FIG. 6B. FIG. 37B is an enlarged view of one of the small protrusions.

FIG. 41A is a plan view corresponding to FIG. 6B. FIG. 41B is an enlarged view of one of the small protrusions.

FIG. 44A is a plan view corresponding to FIG. 6B. FIG. 44B is an enlarged view of one of the small protrusions.

FIG. 48A is a plan view corresponding to FIG. 6B. FIG. 48B is an enlarged view of one of the small protrusions.

FIG. 51A is a plan view corresponding to FIG. 6B. FIG. 51B is an enlarged view of one of the small protrusions.

FIG. 55A is a plan view corresponding to FIG. 6B. FIG. 55B is an enlarged view of one of the small protrusions.

MODES FOR CARRYING OUT THE INVENTION

Figure 1:
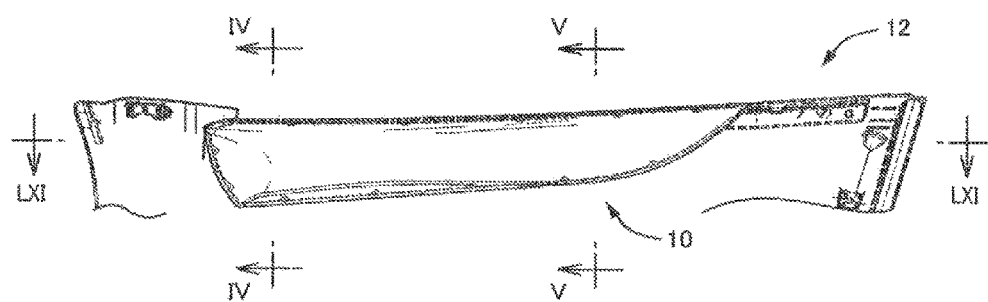
FIG. 1 is a view that shows an upper end portion of a vehicle door trim that has an ornament that is one embodiment of the invention, and is a schematic view when viewed from the side of a decorative surface (the vehicle interior side).

The invention is applied to vehicle interior components, such as a door trim, a luggage side trim and an instrument panel, and ornaments, and the like, that are attached to the interior components. Alternatively, the invention may also be applied to panel components other than components for a vehicle. The invention may be applied not only to plate-like panel components but also to a solid component formed by laminating a second member on the surface of a first member or a base member, having a three-dimensionally curved solid shape. When the first member is used as a base member, relatively hard synthetic resin materials, such as unplasticized polyvinyl chloride, polypropylene, polyethylene and ABS, are preferably used. Alternatively, the first member may be made of another material, such as metal. As the resin material for the first member when it is used as a surface member or as the resin material for the second member, various thermoplastic resins, such as plasticized polyvinyl chloride, a styrene resin, an olefin resin and a polyester resin, are preferably used. As the material for an upholstery member, not only various thermoplastic resins, such as plasticized polyvinyl chloride, a styrene resin, an olefin resin and a polyester resin, but also various upholstery materials, such as a woven fabric, a non-woven fabric, a knitted fabric, vinyl chloride and a flexible film may be employed.

Each of protrusions having an elongate shape in a planar view in the second invention is formed in, for example, a rectangle shape in the planar view. Alternatively, each of the protrusions as a whole may be formed in various elongate shapes such as a circular-arc curved shape and a crank shape. Each of the protrusions is arranged, for example, in such a position that the longitudinal direction of the protrusion is substantially parallel to a corresponding one of sides of each of polygons that constitute a lattice pattern. Each of the protrusions preferably has a tapered shape so that the cross-sectional area decreases toward its distal end. The height H of each protrusion preferably falls within a range of, for example, approximately 2 mm<H<approximately 4 mm. The width d of each rectangular protrusion in a direction perpendicular to the longitudinal direction thereof preferably falls within a range of, for example, approximately 1 mm<d<approximately 2 mm, and the length L of each rectangular protrusion in the longitudinal direction preferably falls within a range of approximately 1.5 mm<L<approximately 2.5 mm.

The lattice pattern, in which the above-described protrusions are arranged, is formed such that, for example, the same equilateral triangles, the same squares or the same regular hexagons, which are used as the polygons, are consecutively repeated. Alternatively, the lattice pattern may be a lattice pattern in which rectangles, rhombuses, parallelograms, scalene triangles, scalene hexagons, or the like are consecutively repeated. Further alternatively, the lattice pattern may be a lattice pattern in which a plurality of types of polygons are regularly repeated or a lattice pattern in which a plurality of types of polygons are irregularly arranged adjacent to each other. That is, various types of lattice patterns may be employed.

Preferably, one protrusion is arranged on each of the sides of each polygon. Alternatively, two or more protrusions may be arranged on each of the sides of each polygon. In the case of a rectangle or a parallelogram, in which the lengths of the sides of each polygon are different from each other, the number of protrusions may differ between a long side and a short side. Each protrusion is arranged, for example, in such a position that the longitudinal direction thereof is parallel to a corresponding one of the sides of each polygon. Alternatively, each protrusion may be arranged in such a position that the longitudinal direction thereof is perpendicular to a corresponding one of the sides or may be arranged in such an inclined position that the longitudinal direction thereof is inclined at a predetermined angle with respect to a corresponding one of the sides. The longitudinal direction of each protrusion may be parallel to or perpendicular to a corresponding one of the sides, depending on a location at which the protrusion is arranged in the lattice pattern.

Each of the protrusions in the second invention is formed such that a vertical cross section perpendicular to the longitudinal direction of the protrusion has, for example, an asymmetrical shape as in the sixth invention, or is formed to have a largely inclined surface as in the seventh invention. Alternatively, each of the protrusions may be formed such that a vertical cross section perpendicular to the longitudinal direction of the protrusion has a symmetrical shape. With the asymmetrical shape in the sixth invention, the protrusions are elastically deformed in a uniform deformation manner. For example, as in the seventh invention, the inclinations of side walls on respective sides in the vertical cross section are different from each other. Note that, not only the configuration in which the inclinations are different along the entire lengths of the side walls but also, for example, the configuration in which the inclinations are partially different, for example, at portions on the distal end side of the protrusion may be employed. Also, when each protrusion protrudes obliquely so as to be inclined with respect to a direction normal to the plate-like portion, the vertical cross section perpendicular to the longitudinal direction has an asymmetrical shape, and each protrusion is easily bent in the inclined direction. Other than the configuration in which each protrusion is bent and deformed toward one of the sides in a direction perpendicular to the longitudinal direction, a configuration in which each protrusion is elastically deformed so as to be twisted in a certain direction about its center line may be employed as a modified mode. The largely inclined surface in the seventh invention preferably has an inclination angle γ of, for example, approximately 15° to approximately 60° with respect to the normal direction, and the inclination angle γ more preferably falls within a range of approximately 20° to approximately 50°.

The sixth invention and the seventh invention are not limited to the case where the shape in a planar view (lateral cross section) is an elongate shape. The shape in a planar view may be a circular shape, a semicircular shape, a square shape, a trapezoidal shape, or the like. In the eighth invention in which the corner shape of a base portion of each protrusion varies around the axis of the protrusion or the ninth invention in which the material of each protrusion varies around the axis of the protrusion, the shape in a planar view may be an elongate shape or may be a circular shape, a semicircular shape, a square shape, a trapezoidal shape, or the like. Therefore, various modes are employed. The asymmetrical shapes in the sixth invention and the seventh invention, the variation in the corner shape in the eighth invention and the variation in the material in the ninth invention each may be solely implemented to impart anisotropy to the bending stiffness. Alternatively, two or more of them may be combined together to impart anisotropy to the bending stiffness.

The lattice pattern in the fifth invention is a honeycomb pattern in which regular hexagons are consecutively repeated. For example, when the shape of each protrusion in a planar view is a rectangular shape, the protrusion is arranged in such a position that the longitudinal direction thereof is parallel to a corresponding one of the sides of each regular hexagon. The pitch P between two parallel sides of each regular hexagon (distance between the centers of the protrusions arranged on the two sides) preferably falls within a range of 3.5 mm≤P≤7.5 mm, and more preferably falls within a range of 4 mm≤P≤7 mm. In the case of P<3.5 mm, each protrusion is small and the formability deteriorates. In the case of P>7.5 mm, a difference in reaction force due to presence or absence of the protrusion (difference in reaction force between a location at which the protrusion is arranged and a location between the protrusions) becomes large, and uncomfortable feel is provided depending on the material or the thickness of the plate-like portion. Each protrusion having an elongate shape in a planar view may be arranged in such a position that the longitudinal direction thereof is perpendicular to a corresponding one of the sides of each regular hexagon or in such an inclined position that the longitudinal direction thereof is inclined with respect to a corresponding one of the sides of each regular hexagon. This also applies to lattice patterns other than the lattice pattern formed of regular hexagons.

When the fourth invention and the fifth invention are implemented, not only the protrusions having an elongate shape in a planar view but also protrusions having a square shape in a planar view, a circular shape in a planar view, a semicircular shape in a planar view, a trapezoidal shape in a planar view, or the like, may be used. For example, it is possible to control the bending direction by forming a largely inclined surface having an inclination angle γ of approximately 15° to approximately 60°. As in the eighth invention and the ninth invention, it is possible to control the bending direction by varying the corner shape or the material. In this case, the pitch P of the honeycomb pattern in the fifth invention preferably falls within, for example, a range of approximately 3.5 mm to approximately 7.5 mm. The appropriate height H of each protrusion preferably falls within a range of approximately 2 mm to approximately 4 mm, and each of the longitudinal and lateral dimensions of each base end preferably falls within a range of approximately 1 mm to approximately 3 mm.

Each protrusion of the eighth invention is formed such that anisotropy is imparted to the protrusion by varying the corner shape of the base portion, at which the protrusion protrudes from the plate-like portion, around the axis of the protrusion. For example, by forming a groove near the base, the protrusion easily topples toward the side on which the groove is formed. A cutout may be formed at the base of each protrusion. By varying the radius r of the corner at which the protrusion protrudes from the plate-like portion to make the radius r on one side larger than that on the opposite side, the protrusion easily topples toward the opposite side.

A linear inclined portion may be formed at the corner portion.

Each protrusion of the ninth invention is formed such that anisotropy is imparted to the protrusion by varying the material of the protrusion around its axis. By combining synthetic resin materials having different hardnesses with each other, the protrusion easily topples toward the side on which the material having a lower hardness is provided. The variation in the material may be provided by, for example, using different materials for two regions obtained by equally dividing each protrusion around its axis, using different materials for regions obtained by equally dividing each protrusion to be, for example, 120°, and the remaining or using different materials for regions obtained by unequally dividing each protrusion at a position offset from its axis. That is, various modes may be employed.

In terms of improving the soft feel, preferably, the multiple protrusions formed so as to be scattered over the plate-like portion are arranged at predetermined intervals on the basis of the height of each protrusion so as not to contact each other at the time of bending deformation. However, for example, the multiple protrusions may be arranged such that the protrusions contact each other in a predetermined deformation stage.

In the twelfth invention, the first member is a surface member, and the second member is fixedly fitted to a plate-like base member, and at least a three-layer structure including the base member is formed. Alternatively, a four-layer structure may be formed by providing an upholstery member on the surface member.

As for a heat medium in the thirteenth invention or compressed gas in the tenth invention, air is preferably used. However, a gas other than air may be used, and a liquid, such as water, may be used as the heat medium. To implement another invention, the heat medium need not be supplied to the space between the first member and the second member or the compressed gas need not be filled in the space between the first member and the second member. It is only necessary to hermetically seal the space or the space may communicate with atmosphere. The thirteenth invention and the fourteenth invention relate to the case where the first member is the base member and the second member is the surface member. However, even in the case of the twelfth invention in which the first member is the surface member and the second member is fixed to the base member, a similar configuration may be employed. The heat medium may be introduced from an air conditioner by providing an inlet port in the second member and the base member or the surface member (first member) may be urged by the compressed gas.

Embodiments

Figure 2:
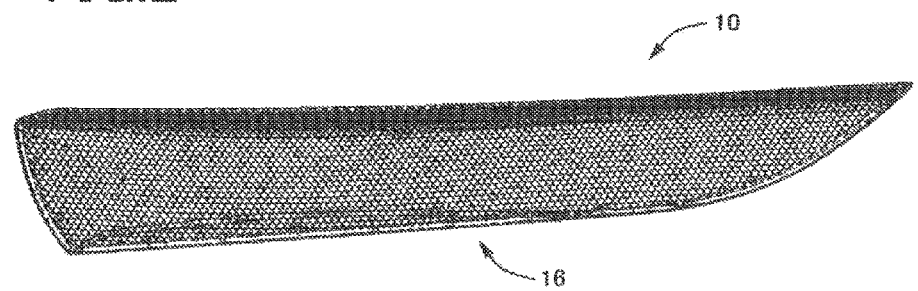
FIG. 2 is a view that shows only the ornament of the vehicle door trim in FIG. 1, and is a perspective view of multiple small protrusions formed on the back face of a surface member, when viewed from the side of the decorative surface.
Figure 3:
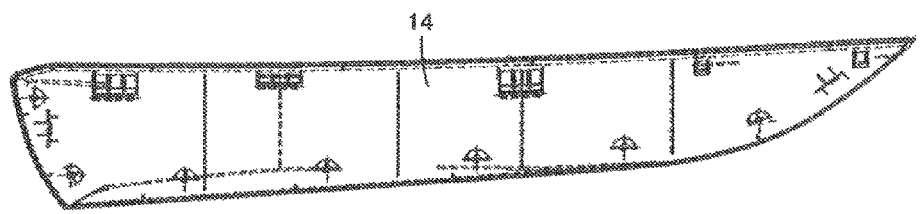
FIG. 3 is a view that shows a base member of the ornament in FIG. 2 with the surface member removed.
Figure 4:
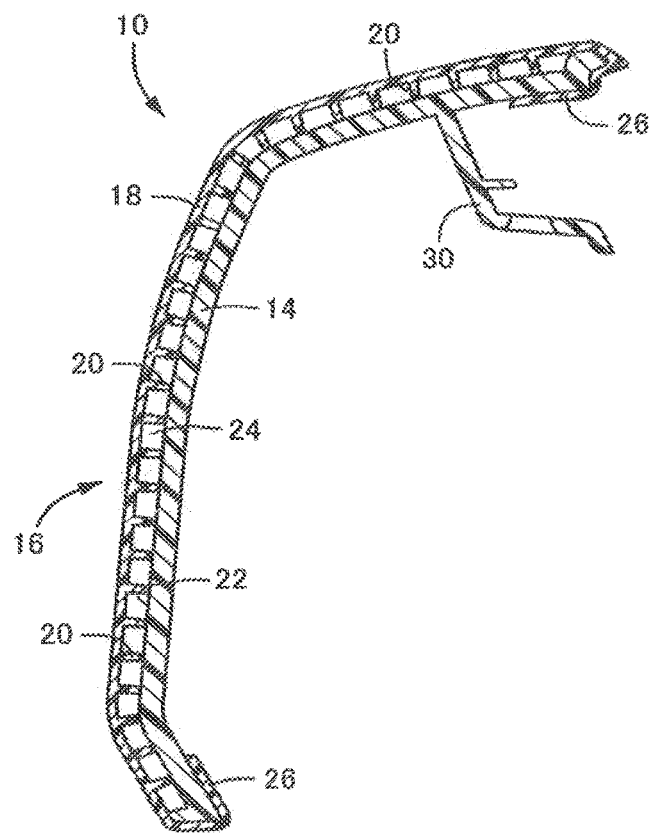
FIG. 4 is an enlarged cross-sectional view taken along the line IV-IV in FIG. 1.
Figure 5:
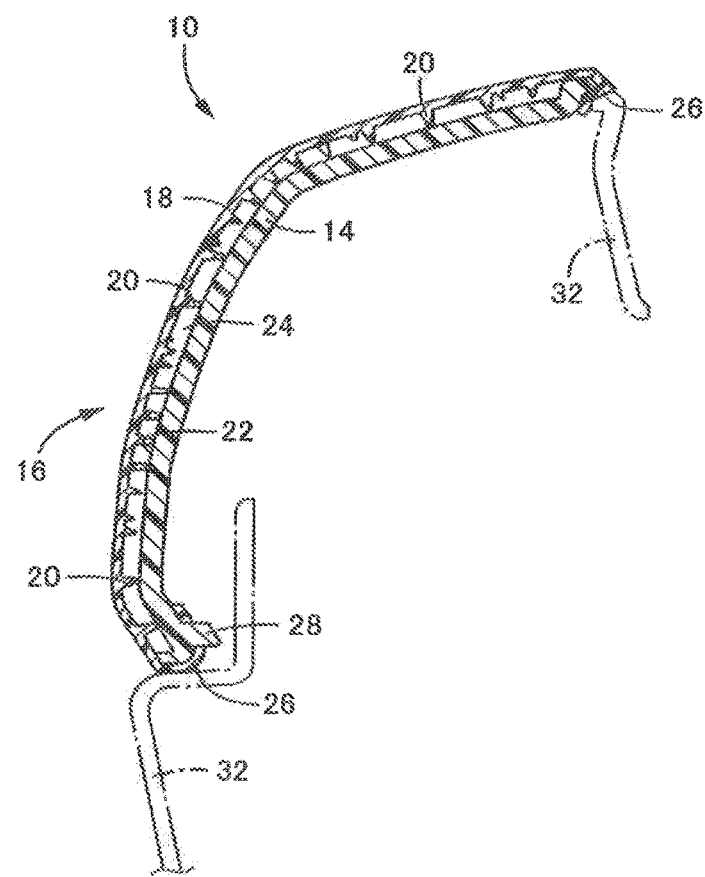
FIG. 5 is an enlarged cross-sectional view taken along the line V-V in FIG. 1.

Hereinafter, embodiments of the invention will be described in detail with reference to the drawings. FIG. 1 is a schematic view that shows a shoulder portion (lower end portion of a window) of an upper end of a vehicle door trim 12 that has an ornament 10 to which the invention is applied, and is a front view when viewed from the side of a decorative surface of a right-side door of a vehicle, that is, the vehicle interior side. FIG. 2 is a view that shows only the ornament 10 in FIG. 1, and is a perspective view of multiple small protrusions 20 (see FIGS. 6A and 6B, for example) formed on the back face of a surface member 16, when viewed from the side of the decorative surface. FIG. 3 is a view that shows a base member 14 of the ornament 10 with the surface member 16 removed. FIG. 4 is a cross-sectional view of the ornament 10, taken along the line IV-IV in FIG. 1. FIG. 5 is a cross-sectional view of the ornament 10, taken along the line V-V in FIG. 1.

The ornament 10 is a laminated component that is formed of the plate-like base member 14 and the surface member 16 arranged so as to be laminated on a surface 22 of the base member 14 substantially in parallel to the surface 22 of the base member 14. The ornament 10 corresponds to a plate-like panel, and the surface 22 of the base member 14 corresponds to a mating surface. The surface member 16 is a second member, and is a single-piece member made of a relatively soft elastically deformable synthetic resin material, such as plasticized polyvinyl chloride. The surface member 16 has a plate-like portion 18 that is substantially parallel to the surface 22, and the multiple small protrusions 20 that protrude toward the surface 22 of the base member 14 are formed integrally with the back face of the plate-like portion 18. By wrapping outer peripheral end portions 26 of the plate-like portion 18 around outer peripheral edge portions of the base member 14 with a space 24 formed between the plate-like portion 18 and the surface 22 due to the small protrusions 20 and distal ends of the small protrusions 20 in close contact with the surface 22, the surface member 16 is fixedly fitted to the base member 14. The small protrusions 20 correspond to the protrusions.

The base member 14 corresponds to the first member. The base member 14 is a single-piece member made of a synthetic resin material, such as polypropylene, which is harder than the surface member 16, and the end portions 26 are engaged with a plurality of engagement protrusions 28 formed at the outer peripheral edge portions of the back face. A plurality of fitting engagement portions 30 are formed integrally with the back face of the base member 14, and the ornament 10 is fixedly fitted to the vehicle door trim 12 via the fitting engagement portions 30. In a state where the ornament 10 is fixedly fitted to the vehicle door trim 12 via the fitting engagement portions 30 as described above, the end portions 26 are pressed against the outer peripheral edge portions of the base member 14 by a plurality of pressing portions 32 provided on the vehicle door trim 12 and a state where the end portions 26 are wrapped around the outer peripheral edge portions is maintained. The end portions 26 may be fixed to the peripheral edge portions of the base member 14 by another fixing means, such as an adhesive agent.

Figure 6A:
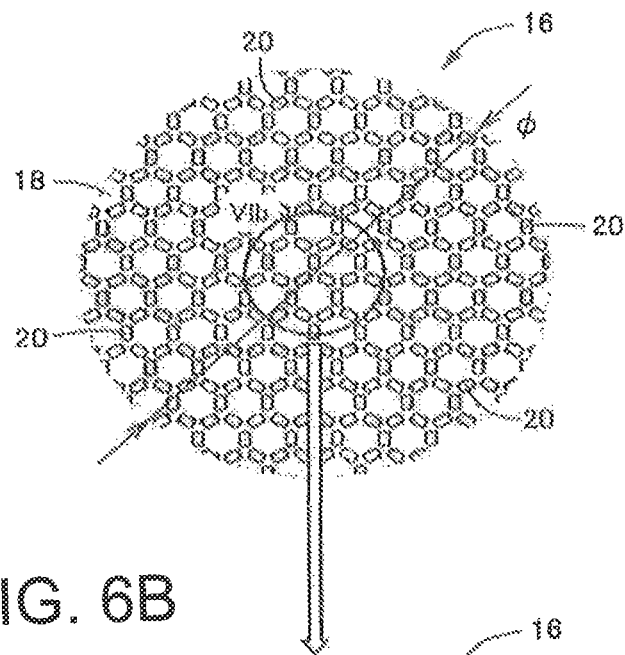
FIGS. 6A and 6B show a view that illustrates the multiple small protrusions formed on the back face of the surface member.
Figure 6B:
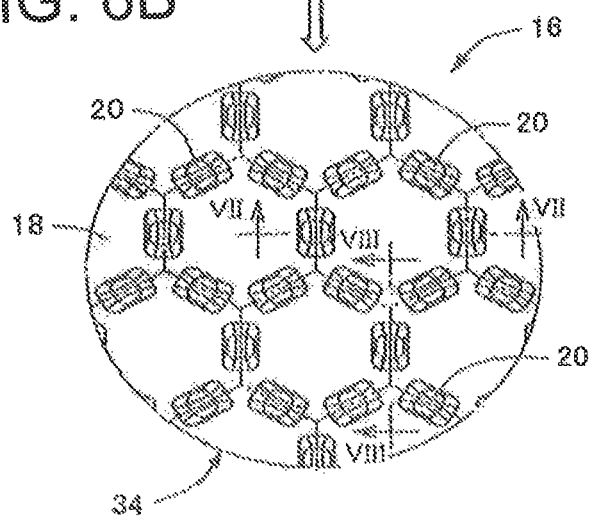
Figure 7:
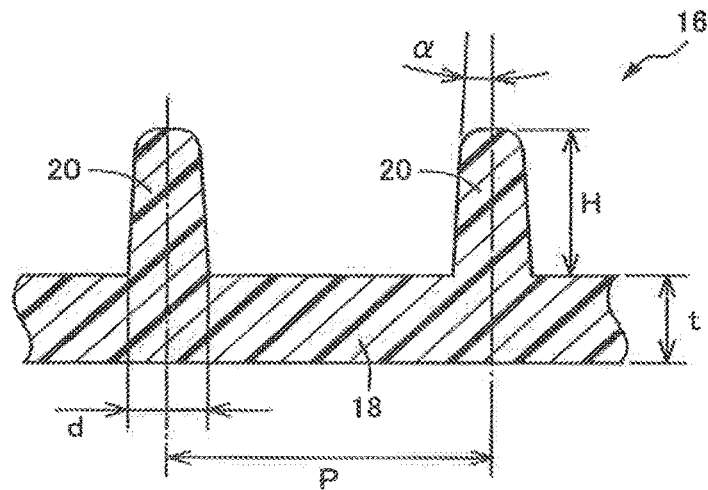
FIG. 7 is an enlarged vertical cross-sectional view taken along the line VII-VII in FIG. 6B.
Figure 8:
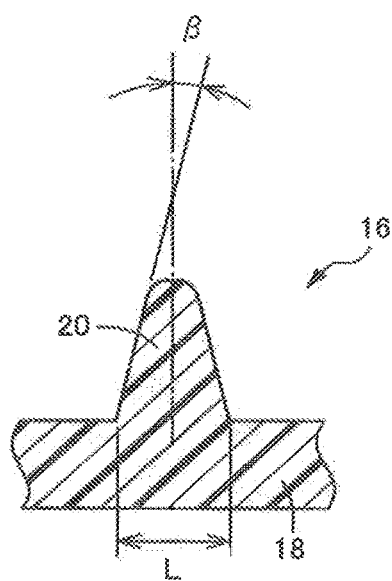
FIG. 8 is an enlarged vertical cross-sectional view taken along the line VIII-VIII in FIG. 6B.

FIGS. 6A and 6B show a view that illustrates the multiple small protrusions 20 formed on the back face of the surface member 16. FIG. 6A is a plan view that shows the small protrusions 20 in a state where the size of each small protrusion 20 is close to an actual size (diameter φ=50 mm), and FIG. 6B is an enlarged plan view that shows a portion VIb in FIG. 6A. These plan views each show a state when viewed from a direction normal to the plate-like portion 18. FIG. 7 is an enlarged vertical cross-sectional view taken along the line VII-VII in FIG. 6B. FIG. 8 is an enlarged vertical cross-sectional view taken along the line VIII-VIII in FIG. 6B. As is apparent from these drawings, the multiple small protrusions 20 have the same shape and have an elongate shape (rectangular shape in the present embodiment) in a planar view (in a state in FIGS. 6A and 6B) when viewed from the direction normal to the plate-like portion 18, and each of the multiple small protrusions 20 is arranged at such a location as to constitute a corresponding one of sides of one of multiple polygons and in such a position that the side is substantially in parallel to the longitudinal direction of the small protrusion 20, so that there is formed a lattice pattern 34 in which each of the sides of each of the multiple polygons having the same shape overlaps with a corresponding one of the sides of an adjacent one of the multiple polygons. In the present embodiment, the shape of each small protrusion 20 in a planar view is a rectangular shape of which four corners are rounded, and each small protrusion 20 is arranged in such a position that the longitudinal direction thereof coincides with a corresponding one of the sides of one of the polygons. As indicated by the alternate long and two-short dashes line in FIG. 6B, the lattice pattern 34 is a honeycomb pattern in which regular hexagons having a uniform size, which are used as the polygons, are consecutively repeated, and one small protrusion 20 is arranged at the center portion of each of the sides of each of the regular hexagons.

As is apparent from FIG. 7 and FIG. 8, each small protrusion 20 has a gently tapered shape so that the cross-sectional area decreases toward its distal end side. The vertical cross-sectional shape in the width direction perpendicular to the longitudinal direction, shown in FIG. 7, and the vertical cross-sectional shape in the longitudinal direction, shown in FIG. 8, each have a symmetrical shape with respect to a neutral plane that is normal to the plate-like portion 18, and the distal end peripheral portions (both end portions of the cross-sectional shape) are rounded. The small protrusions 20 will be further specifically described. A pitch P that is a distance between the two parallel sides of each of the regular hexagons that constitute the lattice pattern 34, that is, a distance between the centers of the small protrusions 20 arranged on these two sides, falls within a range of 4 mm≤P≤7 mm, and is approximately 5 mm in the present embodiment. A height H of each small protrusion 20 falls within a range of 2 mm≤H≤3.5 mm, and is approximately 2.5 mm in the present embodiment. A width d of each small protrusion 20 falls within a range of 1 mm≤d≤2 mm, and is approximately 1.2 mm in the present embodiment. A length L of each small protrusion 20 falls within a range of 1.5 mm≤L≤2.5 mm and is larger than the width d, and is approximately 1.8 mm in the present embodiment. An inclination angle α of each of side walls on respective sides of each small protrusion 20 in the width direction falls within a range of 2°≤α≤5°, and is approximately 3° in the present embodiment. An inclination angle β of each of both end peripheries of each small protrusion 20 in the longitudinal direction falls within a range of 10° to 15°, and is approximately 13° in the present embodiment. A thickness t of the plate-like portion 18 falls within a range of 1 mm≤t≤2 mm, and is approximately 1.5 mm in the present embodiment. These dimensions and angles are appropriately set by taking into account the material, and the like, of the surface member 16 such that a predetermined feel (soft feel, stiff feel, or the like), strength, and the like, are obtained.

In the thus configured ornament 10, when the plate-like portion 18 of the surface member 16 is pressed with a finger or a hand, the distal ends of the small protrusions 20 are pressed against the surface 22 of the base member 14 and are elastically deformed. In this way, cushioning characteristics are imparted, and the predetermined feel is obtained. In the present embodiment, each of the multiple small protrusions 20 has a symmetrical shape. Therefore, when a pressing load is applied to the plate-like portion 18 from the direction normal to the plate-like portion 18, basically, the small protrusions 20 are compressed and deformed in the up-down direction in FIG. 7 and FIG. 8, so that cushioning characteristics are imparted. When a pressing load is applied obliquely to the plate-like portion 18, the small protrusions 20 are not only compressed and deformed in the up-down direction but also bent and deformed in a direction (lateral direction in FIG. 7) perpendicular to the longitudinal direction, so that cushioning characteristics are imparted. In each small protrusion 20, the bending stiffness in the width direction (lateral direction in FIG. 7) perpendicular to the longitudinal direction is smaller than that in the lateral direction in FIG. 8, which is the longitudinal direction, and therefore the bending stiffness against a compression load is anisotropic around the axis of the small protrusion 20.

As described above, in the present embodiment, the plate-like portion 18 is dotted with the multiple small protrusions 20, and the bending stiffness of each small protrusion 20 against a compression load is anisotropic around the axis of the small protrusion 20. Therefore, each small protrusion 20 is easily bent and deformed in a specific direction determined by the anisotropy, and the soft feel improves. That is, because each small protrusion 20 according to the present embodiment has an elongate shape in a planar view, each small protrusion 20 is easily bent and deformed in the width direction perpendicular to the longitudinal direction, and the soft feel improves.

In addition, it is possible to control the bending direction of each small protrusion 20. Therefore, the deformation manner (bending direction, or the like) at the time when each small protrusion 20 is elastically deformed becomes stable, and variations in the feel at the time when the small protrusions 20 are pressed with a finger or a hand are suppressed.

The small protrusions 20 are arranged at such locations as to form the respective sides of each of multiple polygons such that there is formed the lattice pattern 34 in which multiple polygons are arranged consecutively adjacent to each other. Therefore, the multiple small protrusions 20 are formed in a uniform arrangement pattern, and variations in the feel at the time when the small protrusions 20 are pressed with a finger or a hand are suppressed.

The positions of the small protrusions 20 are offset from each other by a predetermined angle (60° in the present embodiment) in accordance with the respective sides in the lattice pattern 34. Accordingly, the bending directions of the small protrusions 20 vary. Therefore, an appropriate stiff feel (not-excessive soft feel) is obtained because the small protrusions 20 support each other. Therefore, it is possible to obtain a further excellent feel due to a combination of the appropriate stiff feel and the soft feel that is obtained through elastic deformation of the small protrusions 20.

The lattice pattern 34 is a honeycomb pattern in which regular hexagons, which are used as the polygons, are consecutively repeated, and the positions of the small protrusions 20 having an elongate shape are offset from each other by 60°. Therefore, the anisotropy of elastic deformation against a pressing load is suppressed in comparison with, for example, a square lattice pattern in which the positions of the small protrusions 20 are offset from each other by 90°. Therefore, a uniform feel is obtained even against a pressing load applied in an oblique direction.

In the present embodiment, only the surface member 16 is laminated on and fixedly fitted to the base member 14 to form the ornament 10 having a two-layer structure. Therefore, it is possible to manufacture the ornament 10 at low cost.

In the present embodiment, the shape of each of the multiple small protrusions 20 in a planar view is a simple rectangular shape. Therefore, the structure of a molding die that is used to mold the surface member 16 having the small protrusions 20 is simple. As a result, it is possible to reduce the manufacturing cost and form the structure at low cost.

Next, another embodiment of the invention will be described. Note that, in the embodiment described below, substantially the same portions as those in the above-described embodiment will be denoted by the same reference numerals as those in the above-described embodiment, and the detailed description thereof will be omitted.

Figure 9:
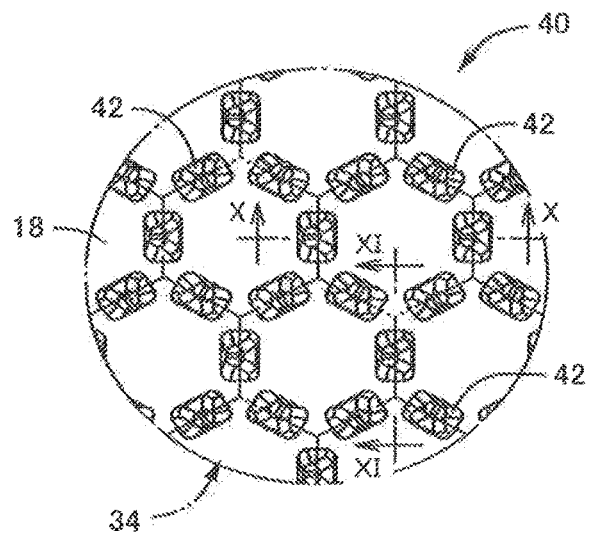
FIG. 9 is a view that illustrates another embodiment of the invention and a plan view corresponding to FIG. 6B.
Figure 10:
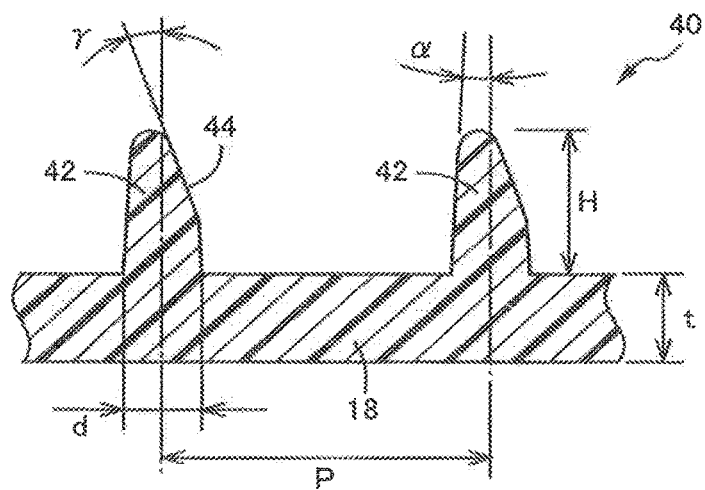
FIG. 10 is an enlarged vertical cross-sectional view taken along the line X-X in FIG. 9.
Figure 11:
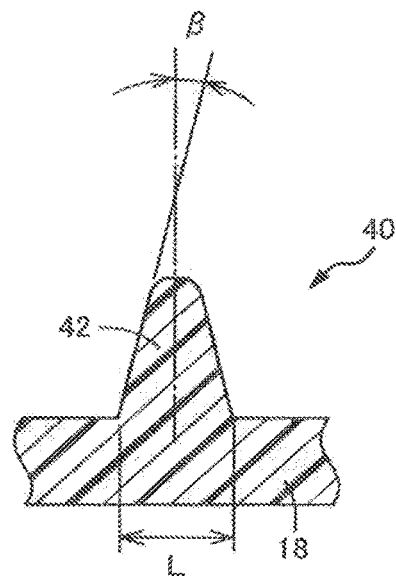
FIG. 11 is an enlarged vertical cross-sectional view taken along the line XI-XI in FIG. 9.

FIG. 9 is an enlarged plan view corresponding to FIG. 6B. A surface member 40 differs from the surface member 16 in the shape of each small protrusion 42. FIG. 10 is an enlarged vertical cross-sectional view taken along the line X-X in FIG. 9. FIG. 11 is an enlarged vertical cross-sectional view taken along the line XI-XI in FIG. 9. As is apparent from these drawings, the present embodiment and the above-described embodiment are the same in that each of the multiple small protrusions 42 has an elongate shape in a planar view (in a state in FIG. 9) when viewed from the direction normal to the plate-like portion 18, and is arranged at such a location as to constitute a corresponding one of sides of each of the regular hexagons that constitute the lattice pattern 34 that is the honeycomb pattern. In addition, the vertical cross-sectional shape of each protrusion 42 in the longitudinal direction, shown in FIG. 11, is also a symmetrical shape and is the same as that of each small protrusion 20. However, each protrusion 42 differs from each small protrusion 20 in that the vertical cross-sectional shape of each protrusion 42 in the width direction, shown in FIG. 10, is an asymmetrical shape with respect to a neutral plane that is normal to the plate-like portion 18. That is, one of the side walls of each protrusion 42 in the width direction is formed at the same inclination angle $\alpha$ as that of each small protrusion 20, whereas the other side wall of each protrusion 42 has a largely inclined surface 44 at its distal end-side portion, the largely inclined surface 44 being inclined toward the inner side, that is, the central axis side of the small protrusion 42, at an inclination angle $\gamma$ that is larger than the inclination angle $\alpha$. The inclination angle $\gamma$ falls within a range of $15° \leq \gamma \leq 25°$, and is approximately 20° in the present embodiment. The other dimensions P, H, L, d, t and angles $\alpha$, $\beta$ are the same as those of each small protrusion 20.

Figure 12:
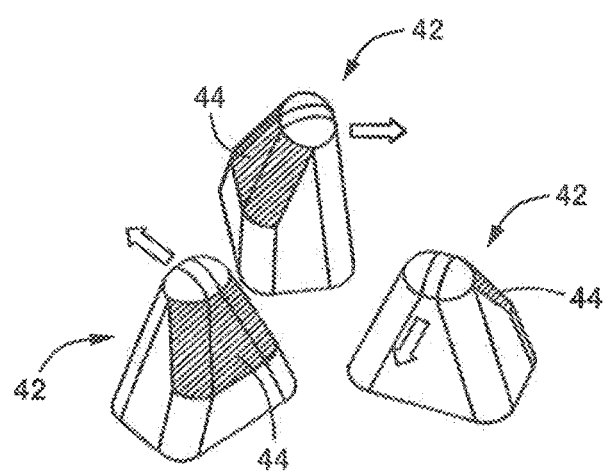
FIG. 12 is a perspective view of the small protrusions shown in FIG. 9.
Figure 13:
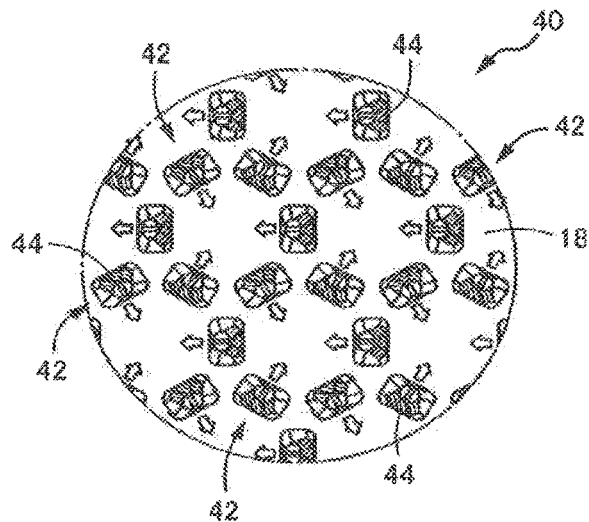
FIG. 13 is a view of the bending direction of each small protrusion with an outlined arrow added to the plan view in FIG. 9.

When the vertical cross-sectional shape in the width direction is made asymmetrical in this way, when the small protrusions 42 are pressed in the direction normal to the plate-like portion 18, each small protrusion 42 is easily bent and deformed toward one side in the width direction, that is, the side opposite to the side on which the largely inclined surface 44 is formed. FIG. 12 is a perspective view that shows the small protrusions 42 according to the present embodiment. FIG. 13 is a plan view that is the same as FIG. 9. Each portion indicated by close oblique lines is the largely inclined surface 44, and each small protrusion 42 is bent and deformed toward the side opposite to the side on which the largely inclined surface 44 is formed, as indicated by an outlined arrow. The small protrusions 42 are arranged in such positions that the bending directions are alternately inverted, around the central axis of a corresponding one of the polygons, that is, a corresponding one of the regular hexagons, which constitute the lattice pattern 34. Specifically, among the six small protrusions 42 arranged on the respective sides that constitute each regular hexagon, three small protrusions 42 located at every other position in the circumferential direction are bent and deformed toward the inner side of the regular hexagon, and the remaining three small protrusions 42 located between the above-described protrusions 42 are bent and deformed toward the outer side of the regular hexagon. In the entire region of the lattice pattern 34, the six small protrusions 42 that constitute each regular hexagon are bent and deformed in the same deformation manner.

In the present embodiment as well, the multiple small protrusions 42 have an elongate shape in a planar view and are arranged so as to constitute the lattice pattern 34 formed of the regular hexagons. Therefore, variations in the feel at the time when the small protrusions 42 are pressed with a finger or a hand are suppressed, and an excellent feel is obtained. Thus, it is possible to obtain similar operation and advantageous effects to those of the above-described embodiment.

Each small protrusion 42 according to the present embodiment is formed such that the vertical cross-sectional shape at a specific position around the axis, that is, in the width direction perpendicular to the longitudinal direction, is an asymmetrical shape, and is elastically deformed so as to always topple in a predetermined bending direction. Therefore, variations in the feel are suppressed, and substantially the same feel is stably obtained.

Each small protrusion 42 has the largely inclined surface 44. Therefore, each small protrusion 42 is easily bent and deformed toward the side opposite to the side on which the largely inclined surface 44 is formed. Accordingly, it is possible to further improve the soft feel obtained through elastic deformation of the small protrusions 42. In addition, by controlling the ease in bending each small protrusion 42 on the basis of the range and the inclination angle $\gamma$ of the largely inclined surface 44, it is possible to appropriately adjust the soft feel.

In addition, it is possible to control the bending direction on the basis of the position at which the largely inclined surface 44 is formed. Therefore, by arranging the small protrusions 42 such that the small protrusions 42 do not contact each other at the time of bending deformation, the small protrusions 42 are arranged as densely as possible. Thus, it is possible to reliably obtain a predetermined soft feel through elastic deformation of the small protrusions 42 while suppressing variations in the feel due to presence and absence of the small protrusions 42.

The small protrusions 42 are arranged such that one small protrusion 42 is arranged on each of the sides of each of the regular hexagons that constitute the lattice pattern 34 and the small protrusions 42 are arranged in such positions that the bending directions are alternately inverted. Therefore, the deformation manner of the small protrusions 42 in the unit of hexagon is substantially the same in the entire region regardless of the fact that each small protrusion 42 is configured so as to be bent and deformed in a certain direction about its axis. Accordingly, a uniform feel is obtained.

Figure 14:
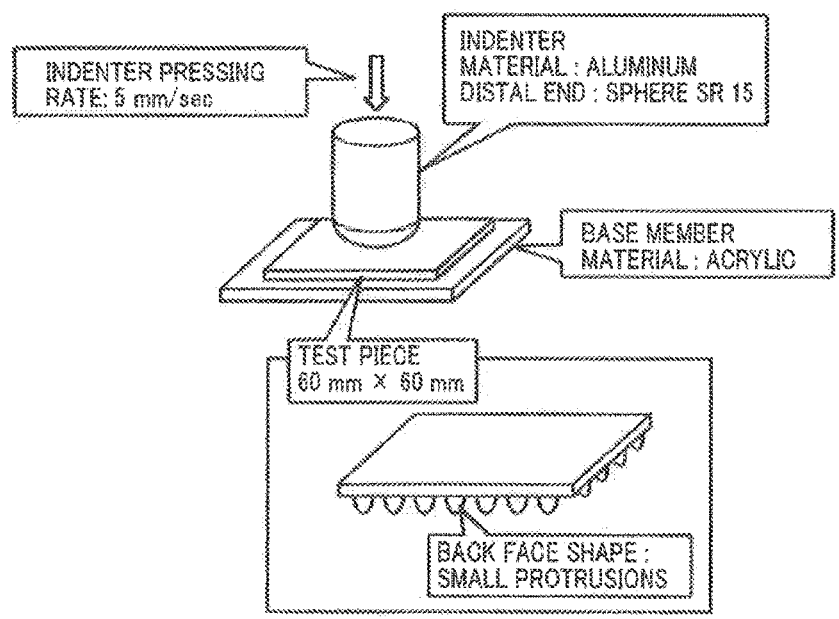
FIG. 14 is a view that illustrates a testing method for determining the correlation between a reaction force and a stroke as to two types of the small protrusions in FIGS. 6A and 6B and FIG. 9.

FIG. 14 is a view that shows a testing method for determining the correlation between a reaction force and a stroke with the use of the flat surface member 16 having the small protrusions 20 and the flat surface member 40 having the small protrusions 42 as test pieces. The surface members 16, 40 each have dimensions of 60 mm by 60 mm, and are made of TPO (thermoplastic elastomer olefin), and the multiple small protrusions 20, 42 are arranged so as to form the honeycomb-shape lattice patterns 34 as in the above-described embodiments. Then, the surface members 16, 40 each were placed on an acrylic base member in such a position that the small protrusions 20, 42 extend downward, and were pressed at a rate of 5 mm/sec with the use of an aluminum indenter of which the radius of the spherical distal end is 15 mm. In this way, the correlation between a reaction force and a stroke was measured with the use of a load cell connected to the indenter.

Figure 15:
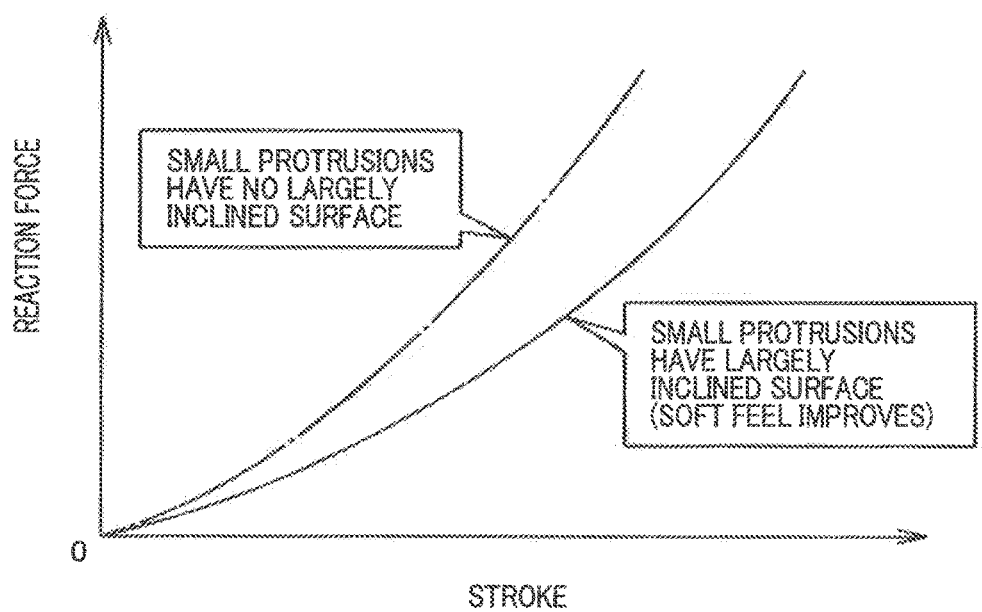
FIG. 15 is a graph of the reaction force-stroke characteristic curves determined in accordance with the testing method in FIG. 14.

FIG. 15 is a graph that shows the reaction force-stroke characteristic curves obtained through the pressing test, in which the solid line indicates the characteristic curve of the surface member 40 that has the small protrusions 42 each having the largely inclined surface 44, and the alternate long and short dash line indicates the characteristic curve of the surface member 16 that has the small protrusions 20 each having no largely inclined surface 44. As is apparent from these characteristic curves, the rate of increase in a reaction force with respect to a stroke is lower in the surface member 40 that has the small protrusions 42 each having the largely inclined surface 44 than in the surface member 16 that has the symmetrical small protrusions 20 each having no largely inclined surface 44. Therefore, the surface member 40 provides a better soft feel.

Figure 16:
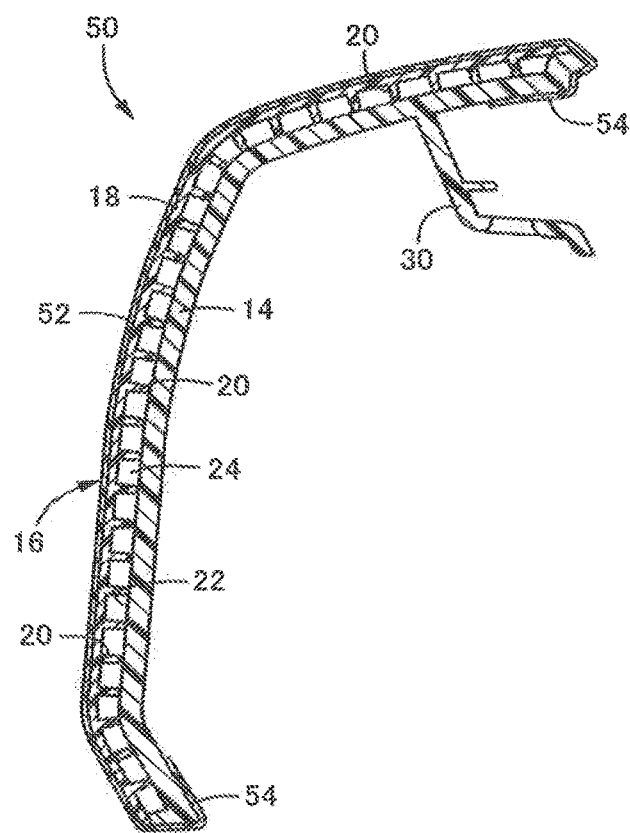
FIG. 16 is a view that illustrates another embodiment in which an upholstery member is bonded to the surface member, and is a cross-sectional view corresponding to FIG. 4.

In contrast to the ornament 10, an ornament 50 shown in FIG. 16 includes an upholstery member 52 that is fixedly bonded to the surface of the surface member 16, that is, the surface of the plate-like portion 18, which is on the side opposite to the side on which the small protrusions 20 are formed, and has a three-layer structure as a whole including the plate-like base member 14. The upholstery member 52 is made of, for example, a woven fabric, a non-woven fabric, a knitted fabric, vinyl chloride, a flexible film, or the like. When the upholstery member 52 is formed integrally with the surface member 16, the upholstery member 52 is formed at the same time that the surface member 16 is formed, and is fixedly bonded to the surface of the surface member 16. In a state where outer peripheral end portions 54 of the upholstery member 52 are wrapped around the outer peripheral edge portions of the base member 14 and are engaged with the engagement protrusions 28 and the ornament 50 is fixedly fitted to the vehicle door trim 12, the end portions 54 are pressed against the outer peripheral edge portions of the base member 14 by the pressing portions 32. In this way, the surface member 16 is fixedly fitted to the base member 14 together with the upholstery member 52. Even when the surface member 40 is provided instead of the surface member 16, it is possible to form a three-layer structure by fixedly bonding the upholstery member 52 to the surface of the surface member 40.

With the thus configured ornament 50 as well, similar operation and advantageous effects to those of the ornament 10 are obtained. In addition, the surface member 16 is covered with the upholstery member 52. Therefore, even if there occurs a sink mark, uneven luster, or the like, on the surface of the plate-like portion 18 of the surface member 16, the surface being on the side opposite to the side on which the small protrusions 20 are formed, the sink mark, uneven luster, or the like, is not exposed to the outside, and damage to the surface member 16 is prevented. Therefore, the range of choices for the resin material of the surface member 16 is broadened, and the flexibility of design in the shape, or the like, of each small protrusion 20 in association with the feel increases. Therefore, it is possible to further easily and appropriately adjust the feel.

Figure 17:
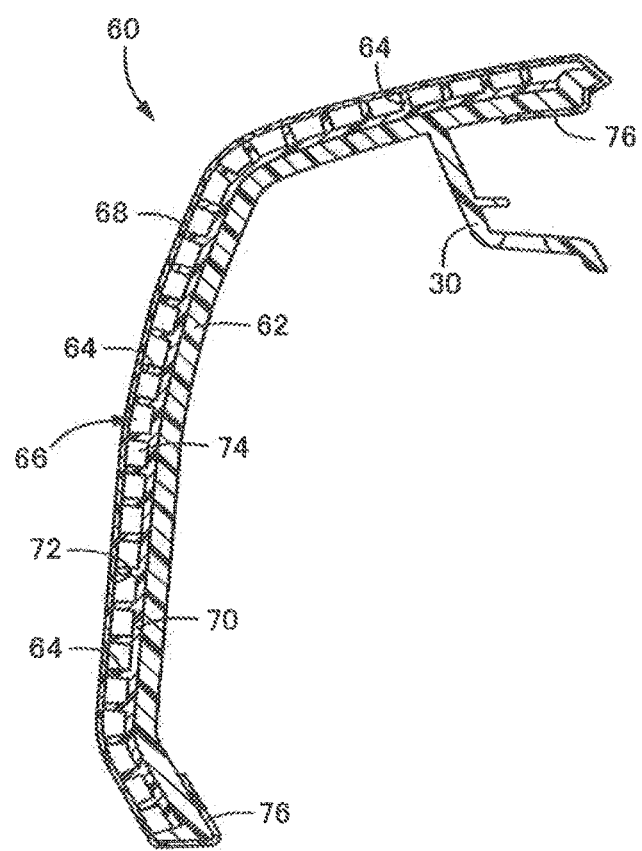
FIG. 17 is a view that illustrates another embodiment in which the first member is the surface member and the second member is fitted to the base member, and is a cross-sectional view corresponding to FIG. 4.

In an ornament 60 shown in FIG. 17, a cushion member 66 having multiple small protrusions 64 is arranged on the surface of a plate-like base member 62, and a surface member 68 is provided so as to be laminated on the side of the cushion member 66, on which the small protrusions 64 are formed. The base member 62 is made of a relatively hard synthetic resin material as in the case of the base member 14, and has the engagement protrusions 28 and the fitting engagement portions 30 that are formed integrally with its back face. The cushion member 66 corresponds to the second member, and is made of an elastically deformable synthetic resin material as in the case of the surface members 16, 40. The cushion member 66 has a plate-like portion 70 that is fixedly fitted to the surface of the base member 62 so as to be in close contact with the surface of the base member 62. The multiple small protrusions 64 are formed integrally with the plate-like portion 70. Each of the small protrusions 64 has a configuration similar to that of each of the small protrusions 20 or 42. The small protrusions 64 are formed so as to protrude from the plate-like portion 70 toward the surface member 68 and to be in close contact with a back face 72 at their distal ends such that a space 74 is formed between the back face 72 of the surface member 68 and the plate-like portion 70. The back face 72 corresponds to the mating surface. The surface member 68 corresponds to the first member. In the present embodiment, the surface member 68 is made of a relatively soft synthetic resin material as in the case of the surface members 16, 40. In a state where outer peripheral end portions 76 of the surface member 68 are wrapped around the outer peripheral edge portions of the base member 62 and are engaged with the engagement protrusions 28 (not shown) and the ornament 60 is fixedly fitted to the vehicle door trim 12, the end portions 76 are pressed against the outer peripheral edge portions of the base member 62 by the pressing portions 32. The upholstery member 52 may be further provided on the surface member 68.

In the thus configured ornament 60, when the surface member 68 is pressed with a finger or a hand, the back face 72 of the surface member 68 is pressed against the distal ends of the small protrusions 64 of the cushion member 66. Therefore, an excellent feel is obtained through elastic deformation of the small protrusions 64. Thus, similar advantageous effects to those of the ornament 10 are obtained. The cushion member 66 that has the small protrusions 64 is covered with the surface member 68, and the plate-like portion 70 of the cushion member 66 is fixed to the base member 62. Therefore, even when there occurs a sink mark, uneven luster, or the like, on the surface of the plate-like portion 70, the surface being on the side opposite to the side on which the small protrusions 64 are formed, the sink mark, the uneven luster, or the like, is not exposed to the outside. Thus, the range of choices for the resin material of the cushion member 66 is broadened, and the flexibility of design in the shape, or the like, of each small protrusion 64 in association with the feel increases. Therefore, it is possible to further easily and appropriately adjust the feel.

Figure 18:
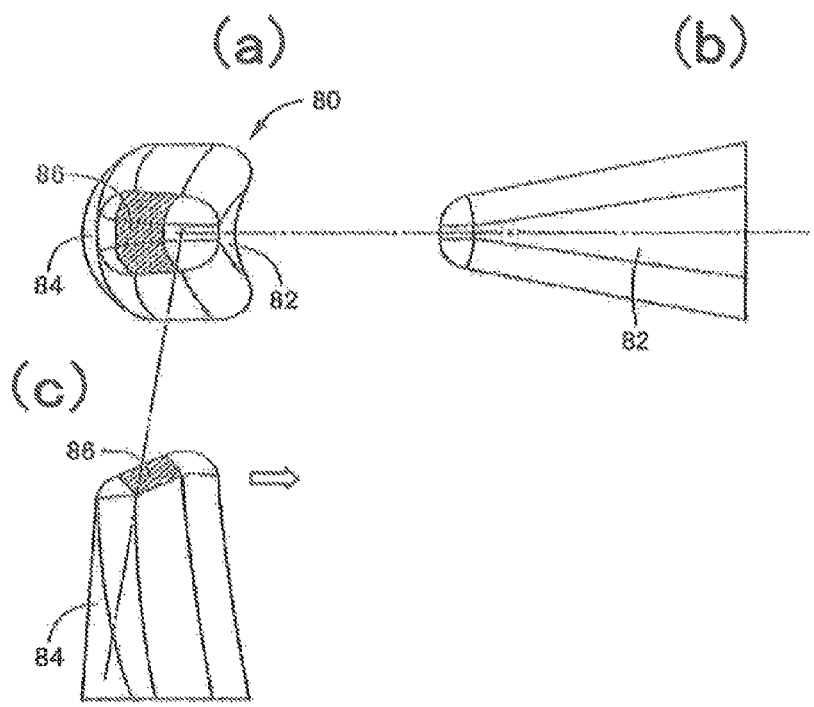
FIG. 18 is a view that illustrates another embodiment in which the shape of each small protrusion is different from each other, and is a three-view drawing of each small protrusion.
Figure 19:
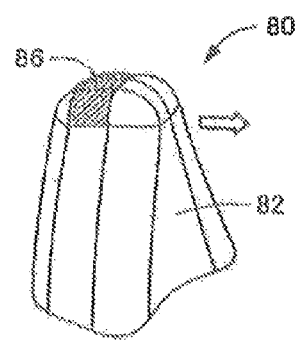
FIG. 19 is a perspective view of each small protrusion in FIG. 18.

FIG. 18 is a view that illustrates yet another embodiment of the invention, and is a three-view drawing of each small protrusion 80 that has a shape different from those of the small protrusions 20, 42. FIG. 19 is a perspective view of each small protrusion 80. In FIG. 18, (a) is a plan view when viewed from the direction normal to the plate-like portion 18 as in the case of FIG. 6B and FIG. 9; (b) is a side view when viewed from the right side of (a); and (c) is a front view when viewed from the lower side of (a). Each small protrusion 80 has an elongate shape that is long in the up-down direction in (a) of FIG. 18, and has a curved shape that is curved smoothly in a circular arc shape in its longitudinal direction. A right side face 82 is a concavely curved surface, and a left side face 84 is a convexly curved surface. The cross section in the width direction that is the lateral direction in (a) of FIG. 18 has an asymmetrical shape. A largely inclined surface 86 having a larger inward-directed inclination angle than that on the opposite side is formed at a portion near the distal end. Each small protrusion 80 is easily bent and deformed toward the right side face 82 side as indicated by an outlined arrow. A portion indicated by close oblique lines in FIG. 18 and FIG. 19 indicates the range of the largely inclined surface 86. The thus configured small protrusions 80, as in the case of, for example, the small protrusions 42, are arranged so as to constitute the lattice pattern 34 formed of polygons, and are arranged in such positions that the bending directions are alternately inverted, around the central axis of a corresponding one of the polygons. Thus, it is possible to obtain similar operation and advantageous effects to those of the embodiment in which the small protrusions 42 are formed. In addition, the stiffness against a pressing load is increased due to the curved shape. Therefore, the range of control on a soft feel and a stiff feel is broadened.

Figure 20:
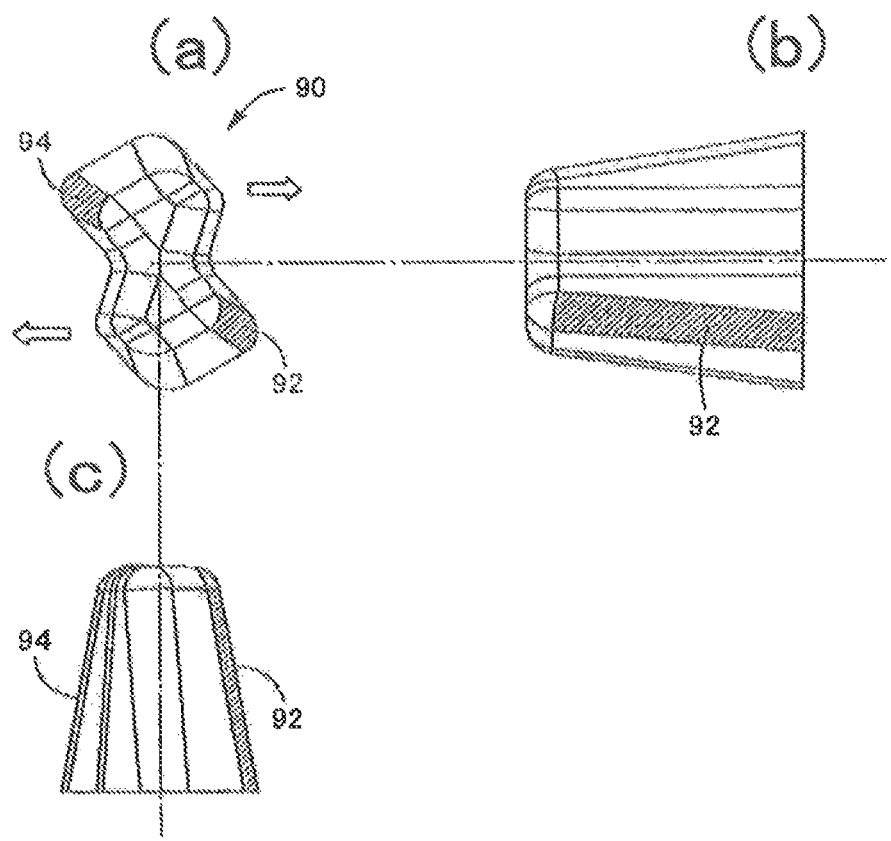
FIG. 20 is a view that illustrates yet another embodiment in which the shape of each small protrusion is different from each other, and is a three-view drawing of each small protrusion.
Figure 21:
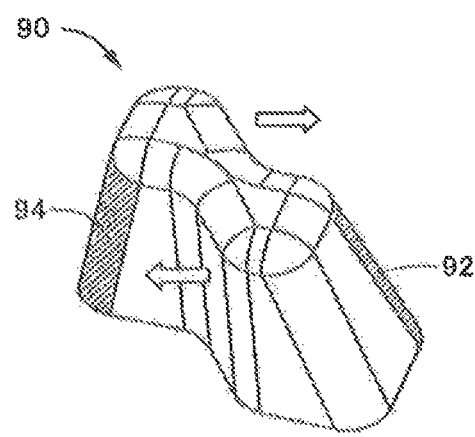
FIG. 21 is a perspective view of each small protrusion in FIG. 20.

FIG. 20 is a view that illustrates yet another embodiment of the invention, and is a three-view drawing of each small protrusion 90 that has a shape different from those of the small protrusions 20, 42. FIG. 21 is a perspective view of each small protrusion 90. In FIG. 20, (a) is a plan view when viewed from the direction normal to the plate-like portion 18 as in the case of FIG. 6B and FIG. 9; (b) is a side view when viewed from the right side of (a); and (c) is a front view when viewed from the lower side of (a). Each small protrusion 90 has an elongate shape that is long in the up-down direction in (a) of FIG. 20, and has a cocoon shape that is curved smoothly in a crank shape in its longitudinal direction. The cross section in the width direction that is the lateral direction in (a) of FIG. 20 has a symmetrical shape at a center portion in the longitudinal direction but has an asymmetrical shape at end portions in the longitudinal direction. A pair of largely inclined surfaces 92, 94 each having a larger inward-directed inclination angle than that on the opposite side are formed. The largely inclined surfaces 92, 94 are formed on the opposite sides in the lateral direction, and each small protrusion 90 is bent and deformed so as to be twisted around the central axis as indicated by outlined arrows. Portions indicated by close oblique lines in FIG. 20 and FIG. 21 are the ranges of the largely inclined surface 92, 94. The thus configured small protrusions 90, as in the case of, for example, the small protrusions 20, are arranged so as to constitute the lattice pattern 34 formed of polygons. Thus, it is possible to obtain similar operation and advantageous effects to those of the embodiment in which the small protrusions 20 are formed. In addition, each of the small protrusions 90 according to the present embodiment is elastically deformed in a uniform deformation manner. Therefore, variations in the feel are suppressed and substantially the same feel is stably obtained. In addition, it is possible to easily adjust the soft feel through control on the ease in bending each small protrusion by changing the range or inclination angle of each of the largely inclined surfaces 92, 94.

Figure 22:
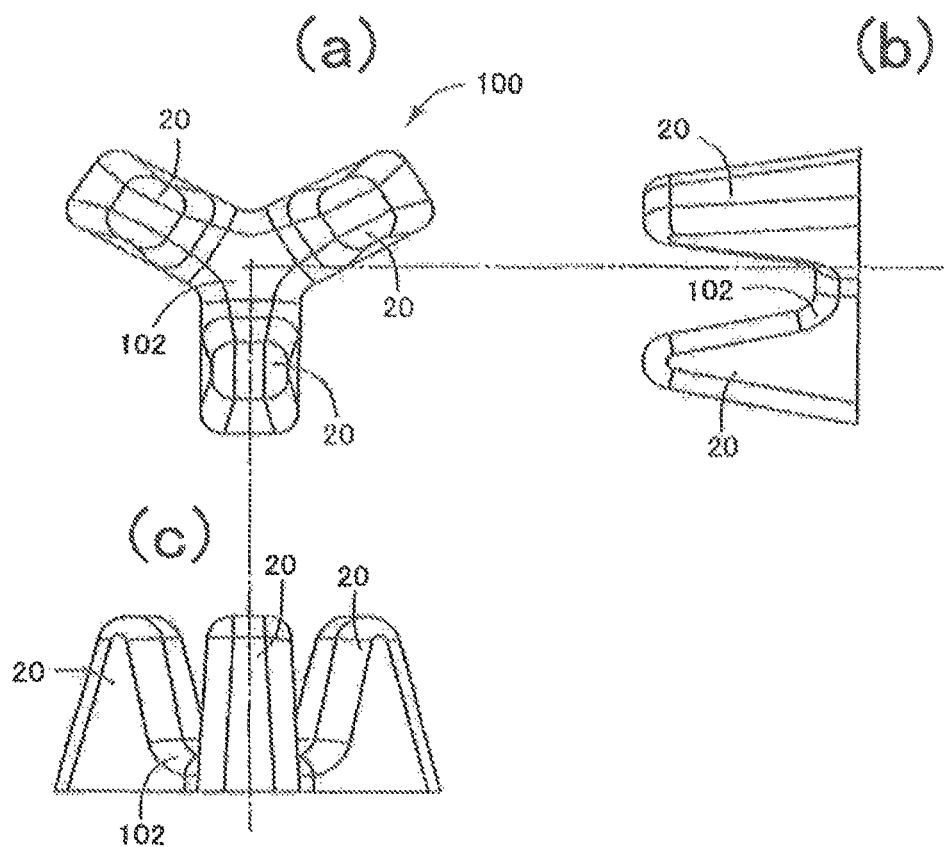
FIG. 22 is a view that illustrates a embodiment in which three small protrusions shown in FIG. 6B are coupled to each other, and is a three-view drawing of each small protrusion group.
Figure 23:
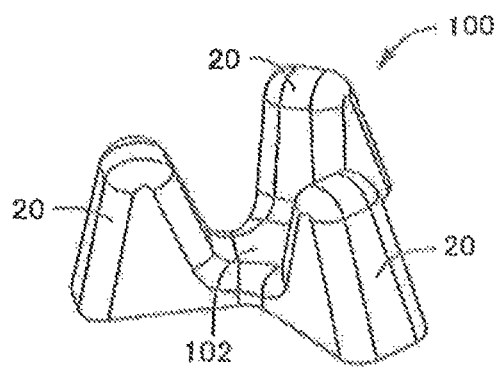
FIG. 23 is a perspective view of each small protrusion group in FIG. 22.

FIG. 22 and FIG. 23 are views that illustrate yet another embodiment of the invention, in which three small protrusions 20 are coupled to each other. FIG. 22 is a three-view drawing of each small protrusion group 100. FIG. 23 is a perspective view of each small protrusion group 100. By coupling the three small protrusions 20 to each other via a coupling portion 102 as described above, the three small protrusions 20 support each other. Therefore, the stiffness against a pressing load increases, and the range of control on a soft feel and a stiff feel is broadened. In the present embodiment, the small protrusions 20 are described. Alternatively, the other small protrusions, such as the small protrusions 42, may also be coupled to each other as described above. The number of small protrusions in one group is not necessarily three, and may be determined as needed.

Figure 24:
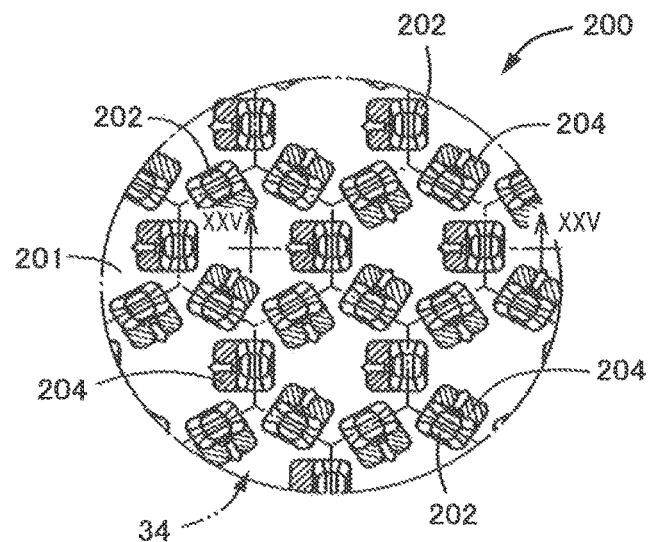
FIG. 24 is a view that illustrates yet another embodiment of the invention, and is a plan view corresponding to FIG. 6B.
Figure 25:
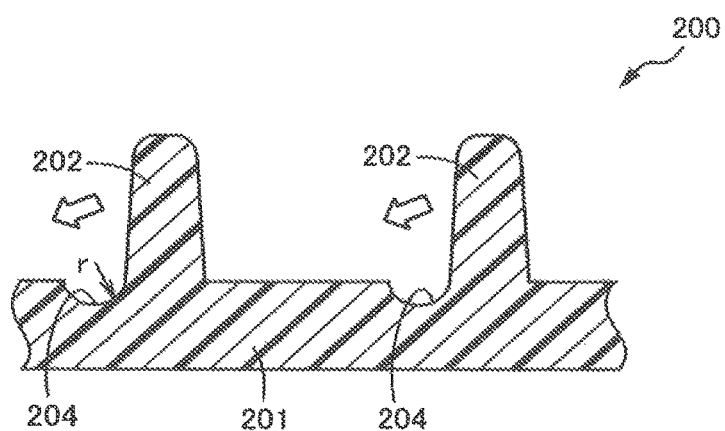
FIG. 25 is an enlarged vertical cross-sectional view taken along the line XXV-XXV in FIG. 24.

FIG. 24 is an enlarged plan view corresponding to FIG. 6B. FIG. 25 is an enlarged vertical cross-sectional view taken along the line XXV-XXV in FIG. 24. Multiple small protrusions 202 are formed on a plate-like portion 201 of a second member 200 that is used as the surface member 16, 40 or the cushion member 66. Each small protrusion 202 differs from each small protrusion 20 in the corner shape of the base portion from which the small protrusion 202 protrudes from the plate-like portion 201. That is, a portion of each small protrusion 202, which protrudes from the plate-like portion 201, is the same as that of each small protrusion 20. However, a groove 204 having a semicircular cross section is formed along the entire length of each small protrusion 202 in the longitudinal direction, at one of the base portions in the width direction perpendicular to the longitudinal direction of the small protrusion 202 that has a rectangular shape in a planar view. Therefore, the bending stiffness on one of the sides in the width direction (lateral direction in FIG. 25), on which the groove 204 is formed, becomes lower, and each small protrusion 202 is easily bent and deformed toward the side on which the groove 204 is formed. Portions indicated by close oblique lines in FIG. 24 are the grooves 204. Outlined arrows in FIG. 24 and FIG. 25 indicate directions in which the small protrusions 202 topple. As in the embodiment shown in FIG. 9 (see FIG. 13), the small protrusions 202 are arranged in such positions that the bending directions are alternately inverted, around the central axis of a corresponding one of the regular hexagons that constitute the lattice pattern 34. The radius r of the circular arc of each groove 204 is, for example, approximately 0.5 mm.

In the present embodiment as well, one small protrusion 202 is arranged on each of the sides of one of the regular hexagons that constitute the lattice pattern 34, and the small protrusions 202 are arranged in such positions that the bending directions are alternately inverted. Therefore, by arranging the small protrusions 202 as densely as possible such that the small protrusions 202 do not contact each other at the time of bending deformation, a predetermined soft feel through elastic deformation of the small protrusions 202 is reliably obtained while variations in the feel are suppressed. In addition, the deformation manner of the small protrusions 202 in the unit of hexagon is substantially the same in the entire range, and a uniform feel is obtained. Thus, similar operation and advantageous effects to those of the embodiment shown in FIG. 9 are obtained.

It is only necessary to form the groove 204 along each of the small protrusions 202. Therefore, a molding die used to mold the second member 200 having the multiple small protrusions 202 and the grooves 204 is easily formed at low cost. Therefore, the manufacturing cost is reduced. In addition, it is possible to control the ease in bending each small protrusion 202 on the basis of the width or depth of each groove 204. Therefore, it is possible to easily and appropriately adjust the soft feel.

Figure 26:
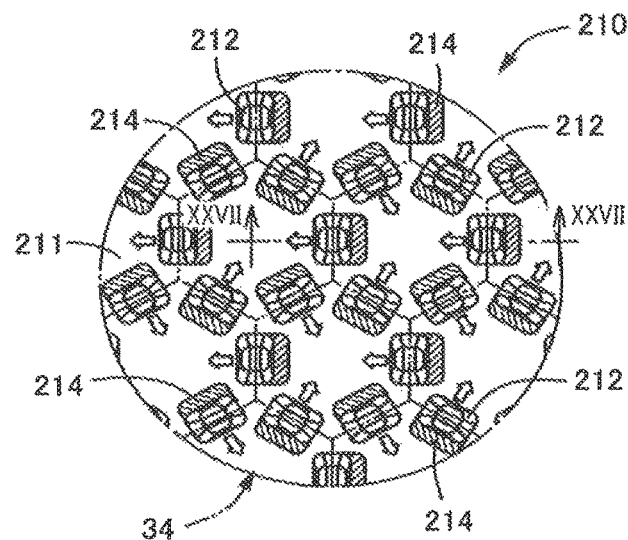
FIG. 26 is a view that illustrates yet another embodiment of the invention, and a plan view corresponding to FIG. 6B.
Figure 27:
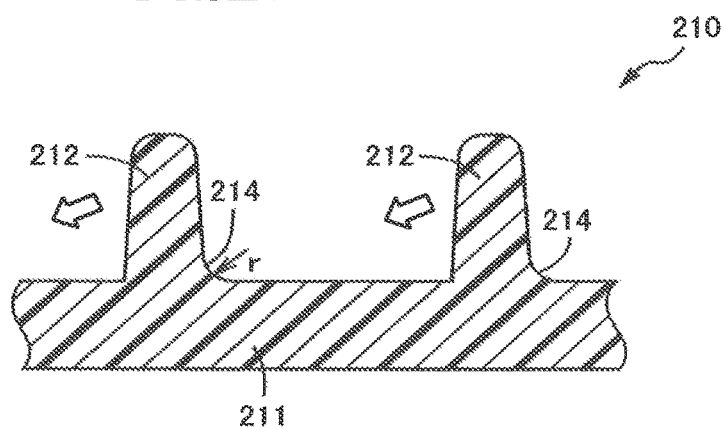
FIG. 27 is an enlarged vertical cross-sectional view taken along the line XXVII-XXVII in FIG. 26.

FIG. 26 is an enlarged plan view corresponding to FIG. 24. FIG. 27 is an enlarged vertical cross-sectional view taken along the line XXVII-XXVII in FIG. 26. A second member 210 differs from the second member 200 in the corner shape of the base portion of each small protrusion 212. That is, in the present embodiment, instead of forming the groove 204, a rounded portion 214 that is smoothly curved from a plate-like portion 211 at a relatively large radius r is formed on the side opposite to the side on which the groove 204 is formed. Therefore, a bending stiffness on one of the sides in the width direction (lateral direction in FIG. 27), on which the rounded portion 214 is formed, becomes higher, and each small protrusion 212 is easily bent and deformed toward the side opposite to the side on which the rounded portion 214 is formed. Portions indicated by close oblique lines in FIG. 26 are the rounded portions 214. Outlined arrows in FIG. 26 and FIG. 27 indicate directions in which the small protrusions 212 topple. As in the embodiment shown in FIG. 24, the small protrusions 212 are arranged in such positions that the bending directions are alternately inverted, around the central axis of a corresponding one of the regular hexagons that constitute the lattice pattern 34. The radius r of each rounded portion 214 is, for example, approximately 0.5 mm.

In the present embodiment as well, by arranging the small protrusions 212 as densely as possible, a predetermined soft feel through elastic deformation of the small protrusions 212 is reliably obtained while variations in the feel are suppressed. In addition, the deformation manner of the small protrusions 212 in the unit of hexagon is substantially the same in the entire range, and a uniform feel is obtained. Thus, similar operation and advantageous effects to those of the embodiment shown in FIG. 24 are obtained. It is only necessary to form the rounded portion 214 along each of the small protrusions 212. Therefore, a molding die used to mold the second member 210 having the multiple small protrusions 212 and the rounded portion 214 is easily formed at low cost. Therefore, the manufacturing cost is reduced. In addition, it is possible to control the ease in bending each small protrusion 212 on the basis of the dimension of the radius r of each rounded portion 214. Therefore, it is possible to easily and appropriately adjust the soft feel.

Figure 28:
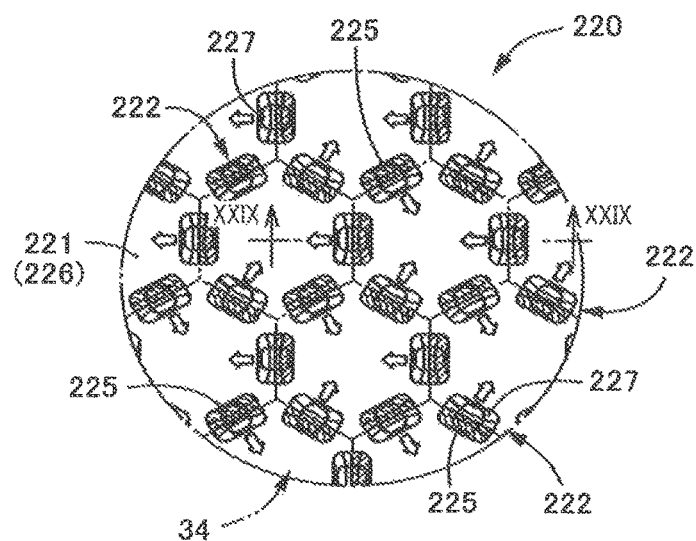
FIG. 28 is a view that illustrates yet another embodiment of the invention, and a plan view corresponding to FIG. 6B.
Figure 29:
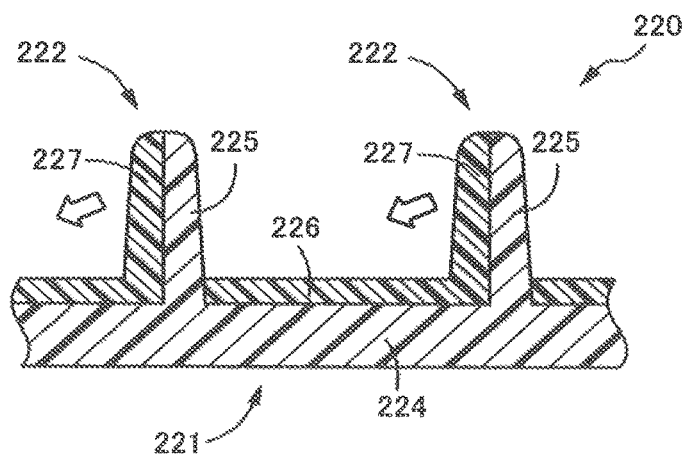
FIG. 29 is an enlarged vertical cross-sectional view taken along the line XXIX-XXIX in FIG. 28.

FIG. 28 is an enlarged plan view corresponding to FIG. 24. FIG. 29 is an enlarged vertical cross-sectional view taken along the line XXIX-XXIX in FIG. 28. A second member 220 differs from the second member 200 in the configuration of each small protrusion 222. That is, in the present embodiment, instead of forming the groove 204, each small protrusion 222 having the same shape as each small protrusion 20 is split into two portions with respect to a split plane that is parallel to the longitudinal direction, and the two portions are respectively formed of a high-hardness portion 225 and a low-hardness portion 227. Therefore, the bending stiffness on one of the sides in the width direction (lateral direction in FIG. 29), on which the high-hardness portion 225 is arranged becomes higher, and each small protrusion 222 is easily bent and deformed toward the opposite side on which the low-hardness portion 227 is arranged. Each high-hardness portion 225 is made of a high-hardness material 224 that also constitutes the main portion of the plate-like portion 221, whereas each low-hardness portion 227 is made of a low-hardness material 226 that is also laminated on the surface side of the high-hardness material 224 and is formed integrally with the portion laminated on the surface side of the high-hardness material 224 through, for example, insert molding. Portions indicated by close oblique lines in FIG. 28 are the high-hardness portions 225. Outlined arrows in FIG. 28 and FIG. 29 indicate directions in which the small protrusions 222 topple. As in the embodiment shown in FIG. 24, the small protrusions 222 are arranged in such positions that the bending directions are alternately inverted, around the central axis of a corresponding one of the regular hexagons that constitute the lattice pattern 34.

The hardness of each high-hardness material 224 and the hardness of each low-hardness material 226 are appropriately set as relative values such that a predetermined bending stiffness is obtained. For example, in durometer type A hardness that is measured in accordance with JIS K6253, preferably, the high-hardness material 224 has a hardness of approximately 80, and the low-hardness material 226 has a hardness of approximately 40. The synthetic resin materials that are fusion-bonded to each other through insert molding are appropriately selected.

In the present embodiment as well, by arranging the small protrusions 222 as densely as possible such that the small protrusions 222 do not contact each other at the time of bending deformation, a predetermined soft feel through elastic deformation of the small protrusions 222 is reliably obtained while variations in the feel are suppressed. In addition, the deformation manner of the small protrusions 222 in the unit of hexagon is substantially the same in the entire range, and a uniform feel is obtained. Thus, similar operation and advantageous effects to those of the embodiment shown in FIG. 24 are obtained. In addition, it is possible to control the ease in bending each small protrusion 222 by changing the materials and the positions of the split planes in the high-hardness material 224 and the low-hardness material 226. Therefore, it is possible to easily and appropriately adjust the soft feel.

Figure 30:
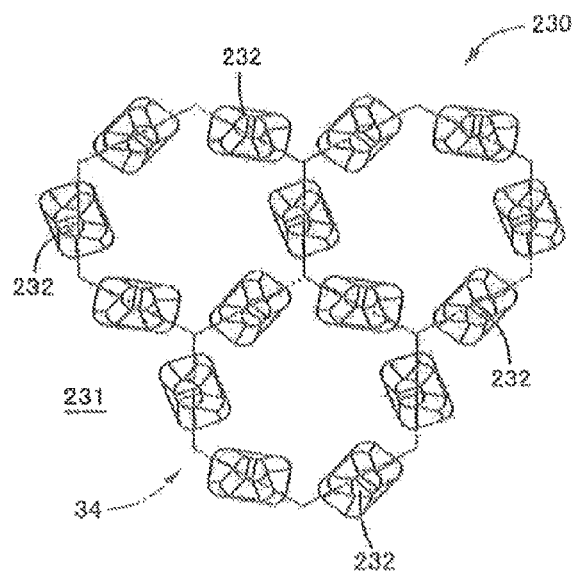
FIG. 30 is a view that illustrates an example in which each small protrusion is arranged so as to be inclined with respect to a corresponding one of the sides of each of the regular hexagons that constitute the lattice pattern in the embodiment in FIG. 9.
Figure 31:
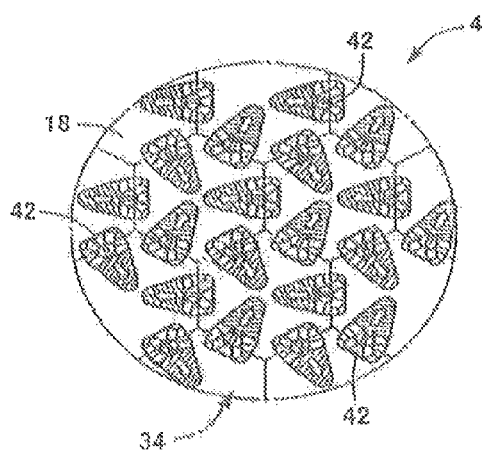
FIG. 31 is a view that shows a range (portion indicated by oblique lines) when each small protrusion is elastically deformed in the embodiment in FIG. 30 in comparison with the embodiment in FIG. 9.
Figure 31:
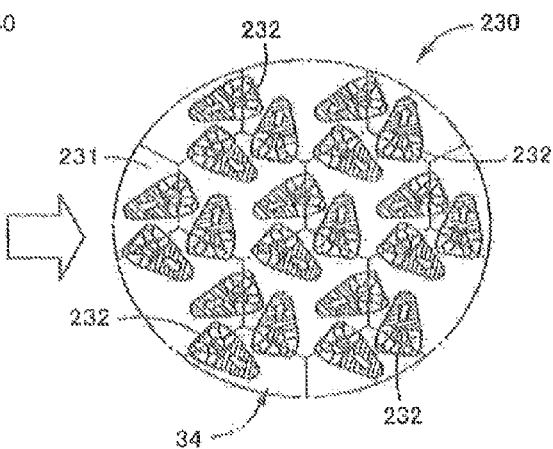

A second member 230 shown in FIG. 30 differs from the surface member 40 shown in FIG. 9 in the position in which each small protrusion 232 is arranged on a plate-like portion 231. Each small protrusion 232 has the same shape as each small protrusion 42. However, each small protrusion 232 is inclined by a predetermined angle (which falls within a range of, for example, approximately 10° to approximately 30°, and approximately 20° in the present embodiment) with respect to a corresponding one of the sides of each of the hexagons that constitute the lattice pattern 34. In the case where each small protrusion 42 is arranged parallel to a corresponding one of the sides of each hexagon as shown in FIG. 9, when each small protrusion 42 is bent and deformed by a compression load, the small protrusion 42 topples toward the center of a corresponding one of the hexagons as indicated by close oblique lines in (a) of FIG. 31. Therefore, the height of each small protrusion 42 is restricted in order to avoid contact between the small protrusions 42. In contrast to this, when each small protrusion 232 is inclined as shown in FIG. 30, the directions in which the small protrusions 232 topple offset from each other as indicated by close oblique lines in (b) of FIG. 31. Therefore, the small protrusions 232 are less likely to contact each other, and, accordingly, it is possible to increase the height of each small protrusion 232, thereby improving the soft feel. The small protrusions according to the other embodiments, such as the small protrusions 202, 212, 222, may also be arranged so as to be inclined in the above-described manner.

Figure 32:
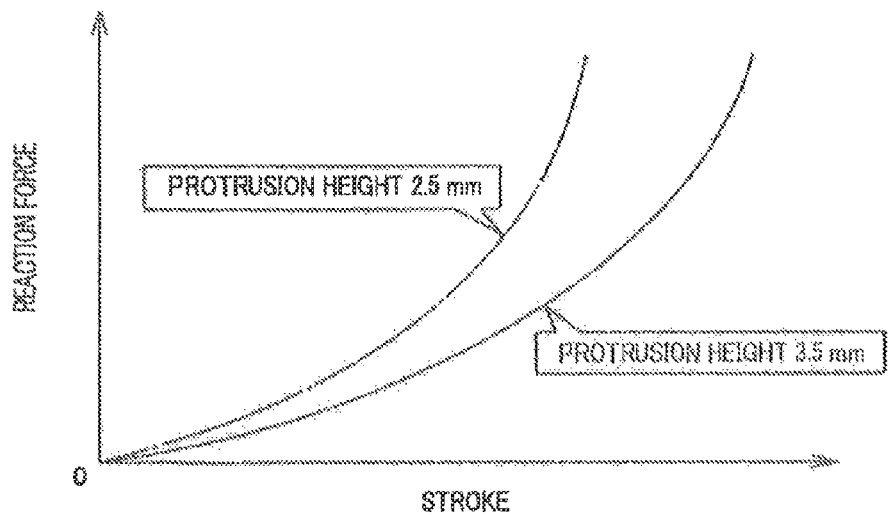
FIG. 32 is a graph that shows the results obtained by determining the correlation between the reaction force and the stroke in accordance with the testing method in FIG. 14, with regard to two types of the small protrusions that the height of each protrusion is different in the embodiment in FIG. 30.

FIG. 32 is a graph that shows the results obtained by determining reaction force-stroke characteristic curves in accordance with the testing method shown in FIG. 14, with regard to the case where the height H of each small protrusion 42 shown in FIG. 9 is 2.5 mm and the case where the height H of each small protrusion 42 shown in FIG. 9 is 3.5 mm. As is apparent from FIG. 32, the reaction force in the case where the height H is 3.5 mm is smaller than that in the case where the height H is 2.5 mm. Therefore, an excellent soft feel is obtained in the case where the height H is 3.5 mm. The dimensions P, L, d, t and the angles α, β of various portions, other than the height H, are the same.

Figure 33:
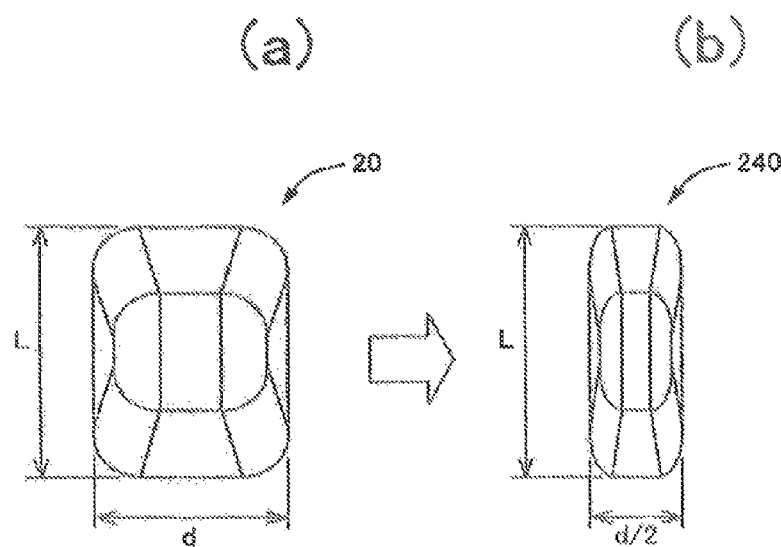
FIG. 33 is a view that illustrates an example in which an aspect ratio is changed in comparison with the embodiment in FIGS. 6A and 6B.

FIG. 33 is an example in which the soft feel is improved by changing an aspect ratio. In FIG. 33, (a) is a plan view of each small protrusion 20 according to the embodiment shown in FIGS. 6A and 6B. Each small protrusion 240 shown in (b) of FIG. 33 is formed such that the width is changed to a half of the width of each small protrusion 20, that is, d/2, while the length L is the same as that of each protrusion 20. In this case, because the width is half of the width of each small protrusion 20, each small protrusion 240 is more easily bent and deformed in the width direction. Therefore, the soft feel improves. With regard to the other small protrusions, such as the small protrusion 42, the soft feel may be adjusted by changing the aspect ratio.

A second member 250 shown in FIGS. 34A and 34B have small protrusions 254 each having a trapezoidal shape in a planar view when viewed from the direction normal to a plate-like portion 252. FIG. 34A is an enlarged plan view corresponding to FIG. 24. FIG. 34B is an enlarged plan view of one of the small protrusions 254. FIG. 35 is a vertical cross-sectional view taken along the line XXXV-XXXV in FIG. 34B. FIG. 36 is a perspective view of a plurality of the small protrusions 254. In each small protrusion 254, a largely inclined surface 256 is formed on the side on which the long side (lower base) of the trapezoidal shape is present, and the stiffness against bending toward the opposite side, that is, the side on which the short side (upper base) is present, which is the left side in FIG. 34B and FIG. 35, is made lower, and each small protrusion 254 is easily bent and deformed toward the side on which the short side is present. Portions indicated by close oblique lines in FIG. 34B and FIG. 36 are the largely inclined surfaces 256. Outlined arrows in FIGS. 34A and 34B to FIG. 36 indicate directions in which the small protrusions 254 topple. As in the embodiment shown in FIG. 24, the small protrusions 254 are arranged in such positions that the bending directions are alternately inverted, around the central axis of a corresponding one of the regular hexagons that constitute the lattice pattern 34. The dimensions a, b, c of the trapezoidal shape are approximately 1.8 mm, approximately 0.9 mm and approximately 1.8 mm, respectively, and the corner radius of each corner portion is approximately 0.3 mm. In addition, the height H≈2.5 mm, the thickness t≈1.5 mm, the inclination angle α of each of side walls on respective sides in the vertical cross section in FIG. 35≈10°, and the inclination angle γ of each largely inclined surface 256≈45°.

In the present embodiment as well, one small protrusion 254 is arranged on each of the sides of one of the regular hexagons that constitute the lattice pattern 34, and the small protrusions 254 are arranged in such positions that the bending directions are alternately inverted. Therefore, by arranging the small protrusions 254 as densely as possible such that the small protrusions 254 do not contact each other at the time of bending deformation, a predetermined soft feel through elastic deformation of the small protrusions 254 is reliably obtained while variations in the feel are suppressed. In addition, the deformation manner of the small protrusions 254 in the unit of hexagon is substantially the same in the entire range, and a uniform feel is obtained. Thus, similar operation and advantageous effects to those of the embodiment shown in FIG. 9 are obtained.

On the other hand, when the shape of each small protrusion 254 in a planar view is a trapezoidal shape as described above, the bending stiffness becomes lower than that when the shape of each small protrusion in a planar view is a square shape. Therefore, a higher soft feel is obtained. In this case, the dimension b of the short side is preferably set smaller than or equal to two-thirds of the dimension a of the long side. Because the largely inclined surface 256 is formed on the side on which the long side of the trapezoidal shape is present, it is possible to obtain a soft feel that is higher than that when a largely inclined surface is formed on the side on which the short side is present.

Other than a product (second member 250) according to the above-described embodiment, a product according to a first modified example shown in FIGS. 37A and 37B to FIG. 40, a product according to a second modified example shown in FIGS. 41A and 41B to FIG. 43 and a product according to a third modified example shown in FIGS. 44A and 44B to FIG. 46 were prepared, and then the reaction force-stroke characteristic curves were determined in accordance with the testing method shown in FIG. 14. The results shown in FIG. 47 were obtained.

Figure 37A:
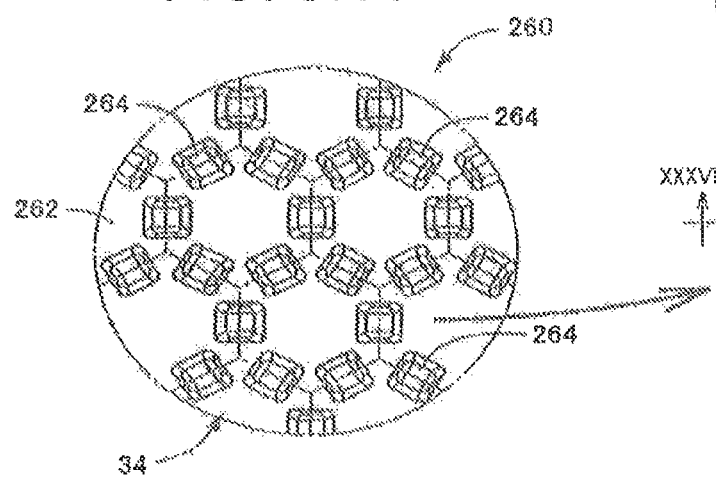
FIGS. 37A and 37B show a view that illustrates the first modified example in which each small protrusion has a square shape in a planar view and the largely inclined surface is not formed.
Figure 37B:
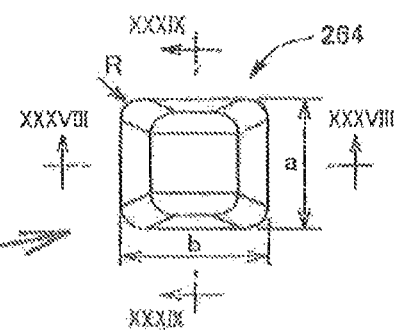
Figure 38:
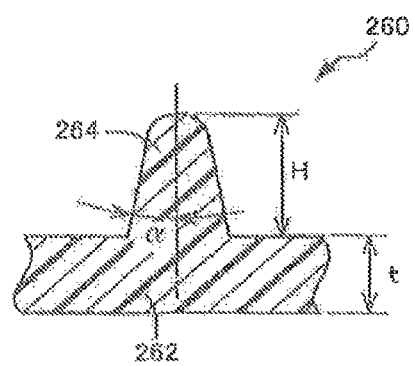
FIG. 38 is a vertical cross-sectional view taken along the line XXXVIII-XXXVIII in FIG. 37B.
Figure 39:
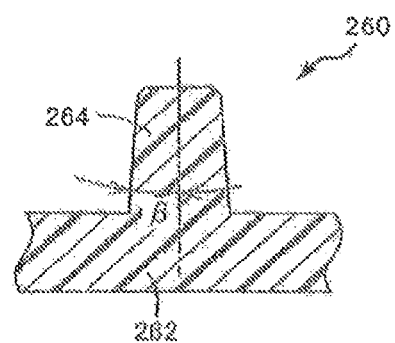
FIG. 39 is a vertical cross-sectional view taken along the line XXXIX-XXXIX in FIG. 37B.
Figure 40:
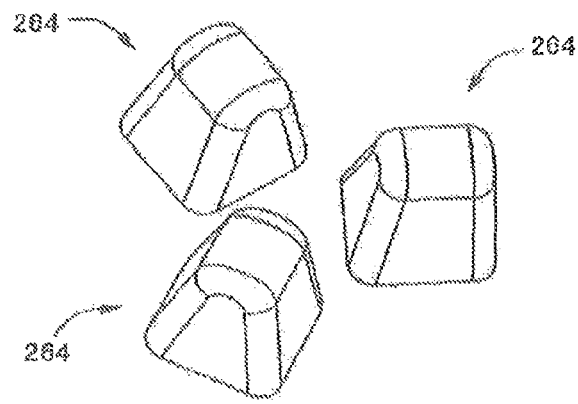
FIG. 40 is a perspective view of the small protrusions in FIGS. 37A and 37B.

A second member 260 according to the first modified example shown in FIGS. 37A and 37B to FIG. 40 has small protrusions 264 each having a substantially square shape in a planar view when viewed from the direction normal to a plate-like portion 262. FIG. 37A is an enlarged plan view corresponding to FIG. 24. FIG. 37B is an enlarged plan view of one of the small protrusions 264. FIG. 38 is a vertical cross-sectional view taken along the line XXXVIII-XXXVIII in FIG. 37B. FIG. 39 is a vertical cross-sectional view taken along the line XXXIX-XXXIX in FIG. 37B. FIG. 40 is a perspective view of a plurality of the small protrusions 264. Each of the dimensions a, b of each small protrusion 264 is approximately 1.8 mm, and the corner radius of each corner portion is approximately 0.3 mm. In addition, the height H≈2.5 mm, the thickness t≈1.5 mm, the inclination angle α of each of side walls on respective sides in the vertical cross section in FIG. 38≈10°, and the inclination angle β of each of side walls on respective sides in the vertical cross section in FIG. 39≈5°. According to the first modified example, each small protrusion 264 is hard to bend and deform in a diagonal direction of the square shape, and is relatively easily bent and deformed in the lateral direction in FIG. 37B and FIG. 38 due to the difference between the inclination angle α and the inclination angle β. The first modified example corresponds to one embodiment of the invention in which bending stiffness is anisotropic around the axis of each small protrusion.

Figure 41A:
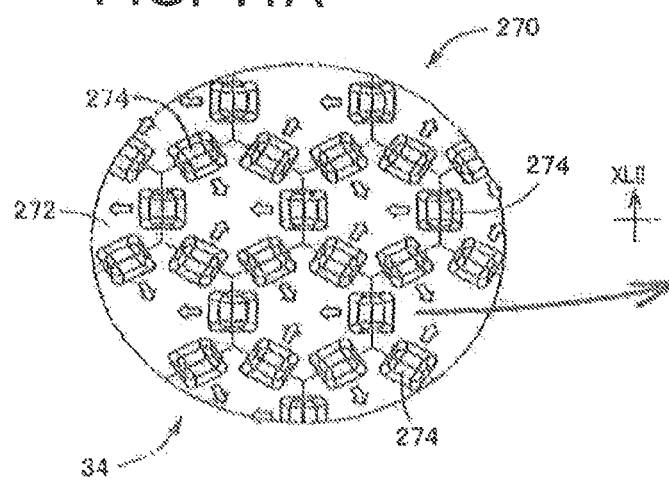
FIGS. 41A and 41B show a view that illustrates the second modified example in which each small protrusion has a square shape in a planar view and the largely inclined surface is formed.
Figure 41B:
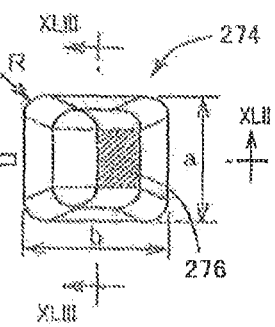
Figure 42:
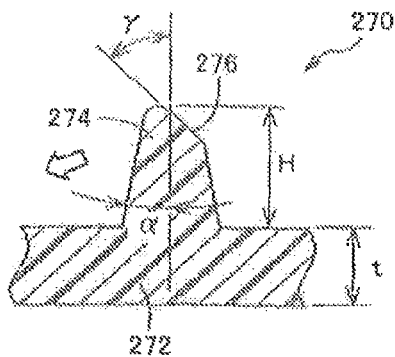
FIG. 42 is a vertical cross-sectional view taken along the line XLII-XLII in FIG. 41B.
Figure 43:
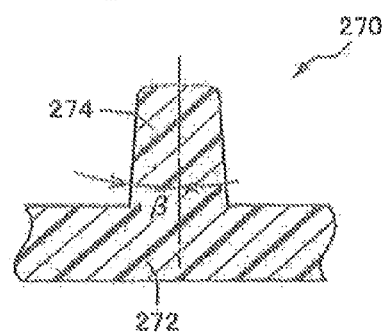
FIG. 43 is a vertical cross-sectional view taken along the line XLIII-XLIII in FIG. 41B.

A second member 270 according to the second modified example shown in FIGS. 41A and 41B to FIG. 43 has small protrusions 274 each having a substantially square shape in a planar view when viewed from the direction normal to a plate-like portion 272. FIG. 41A is an enlarged plan view corresponding to FIG. 24. FIG. 41B is an enlarged plan view of one of the small protrusions 274. FIG. 42 is a vertical cross-sectional view taken along the line XLII-XLII in FIG. 41B. FIG. 43 is a vertical cross-sectional view taken along the line XLIII-XLIII in FIG. 41B. Each small protrusion 274 is substantially the same as that in the first modified example, but differs from each small protrusion in the first modified example in that each small protrusion 274 has a largely inclined surface 276 having an inclination angle γ, the stiffness against bending toward the side opposite to the side on which the largely inclined surface 276 is formed, that is, toward the left side in FIG. 41B and FIG. 42, is made lower and each small protrusion 274 is easily bent and deformed toward the left side. A portion indicated by close oblique lines in FIG. 41B is the largely inclined surface 276. Outlined arrows in FIGS. 41A and 41B to FIG. 42 indicate directions in which the small protrusions 274 topple. As in the embodiment shown in FIG. 24, the small protrusions 274 are arranged in such positions that the bending directions are alternately inverted, around the central axis of a corresponding one of the regular hexagons that constitute the lattice pattern 34. The inclination angle γ is approximately 45°, and the dimensions a, b, R, H, t and the angles α, β of various portions other than the inclination angle γ are the same as those of each small protrusion 264 according to the first modified example. The second modified example also corresponds to one embodiment of the invention in which bending stiffness is anisotropic around the axis of each small protrusion.

Figure 44A:
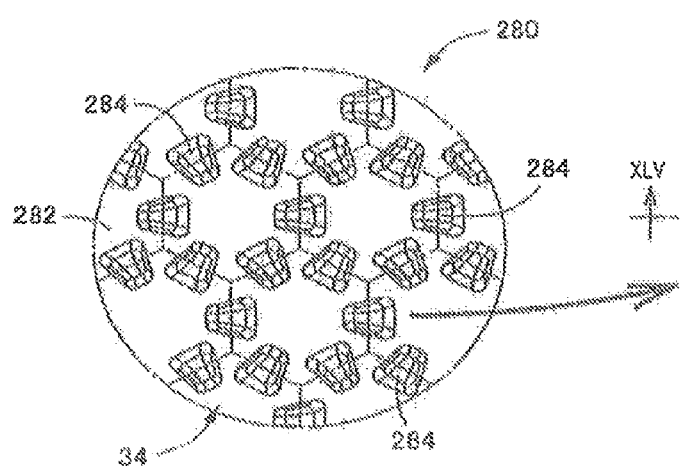
FIGS. 44A and 44B show a view that illustrates the third modified example in which each small protrusion has a trapezoidal shape in a planar view and the largely inclined surface is not formed.
Figure 44B:
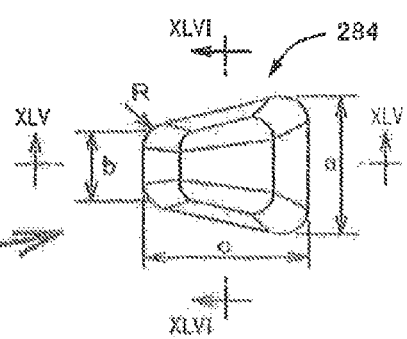
Figure 45:
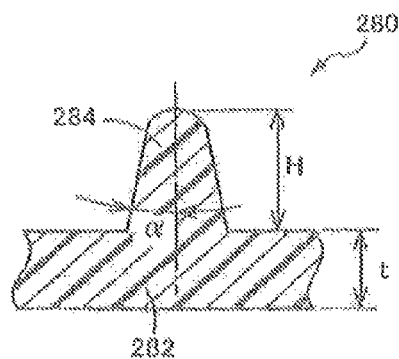
FIG. 45 is a vertical cross-sectional view taken along the line XLV-XLV in FIG. 44B.
Figure 46:
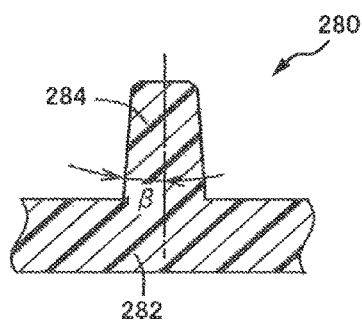
FIG. 46 is a vertical cross-sectional view taken along the line XLVI-XLVI in FIG. 44B.

A second member 280 according to the third modified example shown in FIGS. 44A and 44B to FIG. 46 has small protrusions 284 each having a trapezoidal shape in a planar view when viewed from the direction normal to a plate-like portion 282. FIG. 44A is an enlarged plan view corresponding to FIG. 24. FIG. 44B is an enlarged plan view of one of the small protrusions 284. FIG. 45 is a vertical cross-sectional view taken along the line XLV-XLV in FIG. 44B. FIG. 46 is a vertical cross-sectional view taken along the line XLVI-XLVI in FIG. 44B. Each small protrusion 284 is substantially the same as each small protrusion 254 of the second member 250 that is the product according to the embodiment, but differs from each small protrusion 254 in that no largely inclined surface 256 having an inclination angle γ is formed and each of the vertical cross sections shown in FIG. 45 and FIG. 46 has a symmetrical shape with respect to the center line. In this case as well, each small protrusion 284 is easily bent and deformed toward the left side in FIG. 44B and FIG. 45, that is, toward the side on which the short side of the trapezoidal shape is present. As in the case of the second member 250 shown in FIGS. 34A and 34B, the small protrusions 284 are arranged in such positions that the bending directions are alternately inverted, around the central axis of a corresponding one of the regular hexagons that constitute the lattice pattern 34. The dimensions a, b, c, R, H, t and the angle α of various portions are the same as those of each small protrusion 254 of the second member 250, and the inclination angle β of each of side walls on respective sides in the cross section in FIG. 46 is approximately 5°. β≈5° applies also to each small protrusion 254. The third modified example also corresponds to one embodiment of the invention in which bending stiffness is anisotropic around the axis of each small protrusion.

Figure 47:
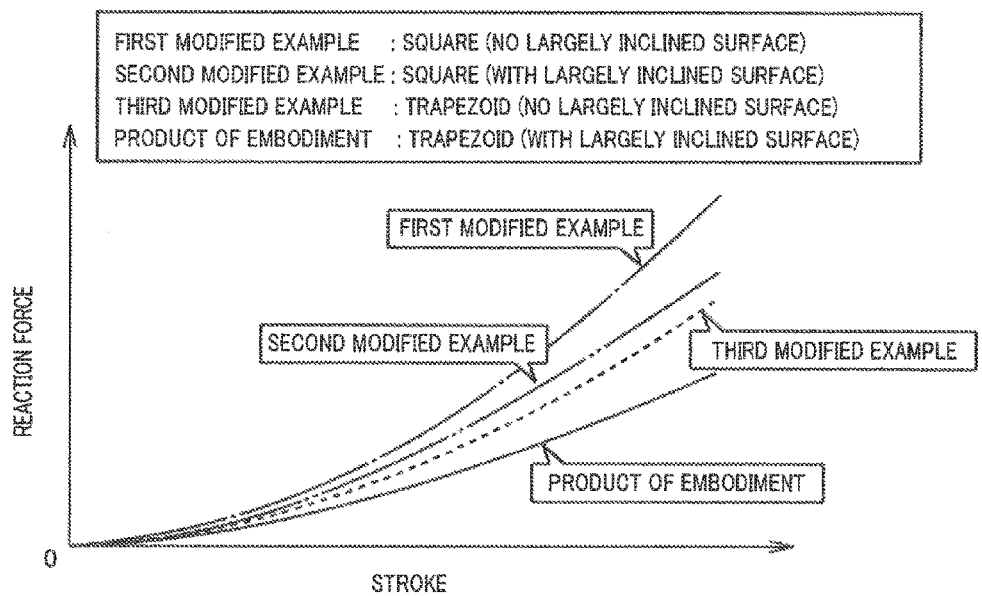
FIG. 47 is a graph that shows the results obtained by determining the correlation between the reaction force and the stroke in accordance with the testing method in FIG. 14 by using the first to third modified examples and the embodiment in FIGS. 34A and 34B.

As is apparent from the test results in FIG. 47, in the product according to the embodiment shown in FIGS. 34A and 34B, that is, the second member 250 that has the small protrusions 254 each having a trapezoidal shape and the largely inclined surface 256, the reaction force (bending stiffness) is lower than that in the second modified example in which the small protrusions 274 each having a square shape and the largely inclined surface 276 are formed. Therefore, an excellent soft feel is obtained. In addition, in the third modified example in which the small protrusion 284 each having a trapezoidal shape and no largely inclined surface are formed, the soft feel is lower than that of the product according to the embodiment. However, a soft feel that is better than that in the second modified example is obtained. From these points of view, it is considered that, just by forming each protrusion in a trapezoidal shape in a planar view, each small protrusion is more easily bent and deformed. As a result, the reaction force becomes lower and an excellent soft feel is obtained. The difference in reaction force between the product according to the embodiment and the product according to the third modified example and the difference in reaction force between the product according to the second modified example and the product according to the first modified example depend on presence or absence of the largely inclined surfaces 256, 276. Therefore, it is found that, by forming the largely inclined surfaces 256, 276, the reaction force becomes lower and the soft feel improves.

Figure 48A:
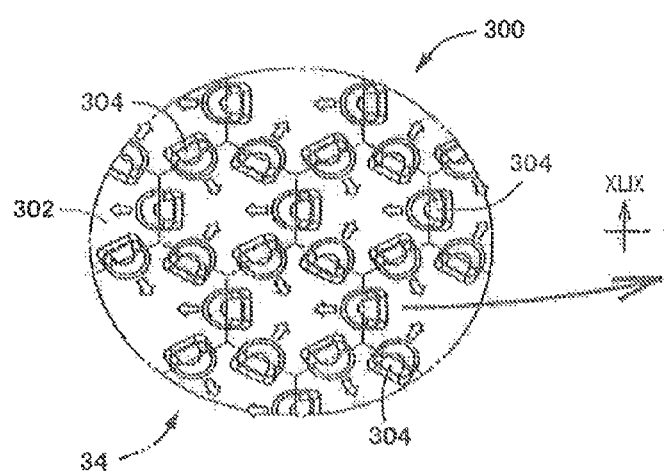
FIGS. 48A and 48B show a view that illustrates yet another embodiment of the invention in which each small protrusion has a semicircular shape in a planar view and a largely inclined surface is formed on the side on which the linear portion of the semicircular shape is present.
Figure 48B:
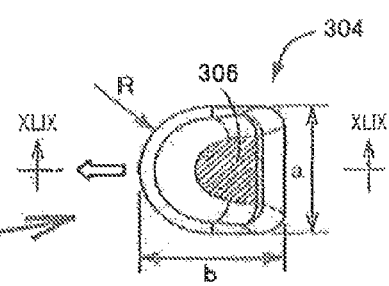
Figure 49:
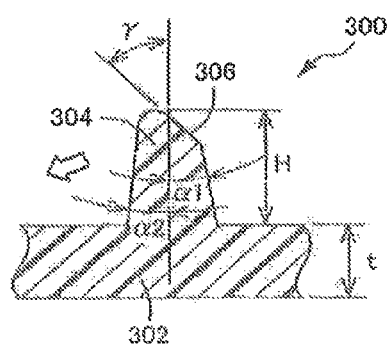
FIG. 49 is a vertical cross-sectional view taken along the line XLIX-XLIX in FIG. 48B.
Figure 50:
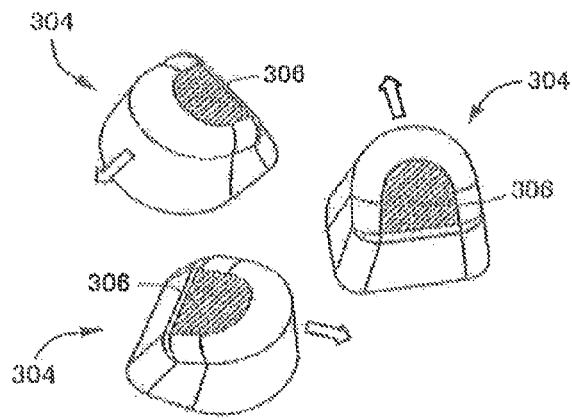
FIG. 50 is a perspective view of the small protrusions in FIGS. 48A and 48B.

A second member 300 shown in FIGS. 48A and 48B has small protrusions 304 each having a semicircular shape in a planar view when viewed from the direction normal to a plate-like portion 302. FIG. 48A is an enlarged plan view corresponding to FIG. 24. FIG. 48B is an enlarged plan view of one of the small protrusions 304. FIG. 49 is a vertical cross-sectional view taken along the line XLIX-XLIX in FIG. 48B. FIG. 50 is a perspective view of a plurality of the small protrusions 304. Each small protrusion 304 has a largely inclined surface 306 on the side on which the linear portion of the semicircular shape is present, the stiffness against bending toward the opposite side, that is, toward the side on which the circular arc is present, which is the left side in FIG. 48B and FIG. 49, is made lower, and each small protrusion 304 is easily bent and deformed toward the side on which the circular arc is present. Portions indicated by close oblique lines in FIG. 48B and FIG. 50 are the largely inclined surfaces 306. Outlined arrows in FIGS. 48A and 48B to FIG. 50 indicate directions in which the small protrusions 304 topple. As in the embodiment shown in FIG. 24, the small protrusions 304 are arranged in such positions that the bending directions are alternately inverted, around the central axis of a corresponding one of the regular hexagons that constitute the lattice pattern 34. Each of the longitudinal and lateral dimensions a, b of the semicircular shape is approximately 1.8 mm, and the radius R of the semicircular arc is approximately 0.9 mm. In addition, the height H≈2.5 mm, the thickness t≈1.5 mm, the inclination angle α1 of the side wall on the largely inclined surface 306 side, that is, the linear portion side, in the vertical cross section in FIG. 49≈10°, the inclination angle α2 on the opposite side, that is, the circular arc side≈5°, and the inclination angle γ of the largely inclined surface 306≈45°.

In the present embodiment as well, one small protrusion 304 is arranged on each of the sides of one of the regular hexagons that constitute the lattice pattern 34, and the small protrusions 304 are arranged in such positions that the bending directions are alternately inverted. Therefore, by arranging the small protrusions 304 as densely as possible such that the small protrusions 304 do not contact each other at the time of bending deformation, a predetermined soft feel through elastic deformation of the small protrusions 304 is reliably obtained while variations in the feel are suppressed. In addition, the deformation manner of the small protrusions 304 in the unit of hexagon is substantially the same in the entire range, and a uniform feel is obtained. Thus, similar operation and advantageous effects to those of the embodiment shown in FIG. 9 are obtained.

On the other hand, when the shape of each small protrusion 304 in a planar view is a semicircular shape as described above, bending stiffness becomes lower than that when the shape of each small protrusion in a planar view is a square shape as in the second modified example. Therefore, a higher soft feel is obtained. Because the largely inclined surface 306 is formed on the side on which the linear portion of the semicircular shape is present, it is possible to obtain a soft feel that is higher than that when a largely inclined surface is formed on the circular arc side.

Other than a product (second member 300) according to the above-described embodiment, the product according to the first modified example shown in FIGS. 37A and 37B to FIG. 40, the product according to the second modified example shown in FIGS. 41A and 41B to FIG. 43 and a product according to a fourth modified example shown in FIGS. 51A and 51B to FIG. 53 were prepared, and then the reaction force-stroke characteristic curves were determined in accordance with the testing method shown in FIG. 14. The results shown in FIG. 54 were obtained.

Figure 51A:
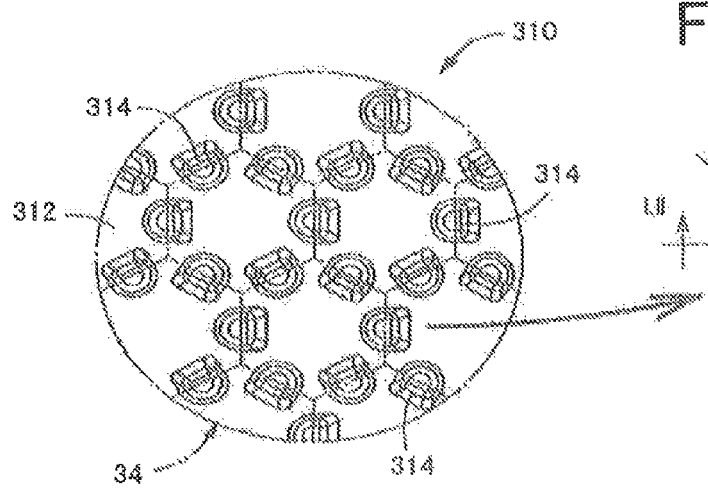
FIGS. 51A and 51B show a view that illustrates the fourth modified example in which each small protrusion has a semicircular shape in a planar view and a largely inclined surface is not formed.
Figure 51B:
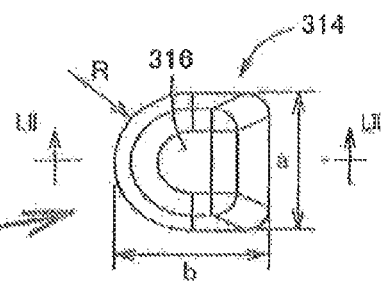
Figure 52:
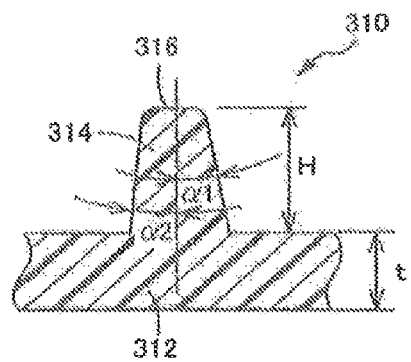
FIG. 52 is a vertical cross-sectional view taken along the line LII-LII in FIG. 51B.
Figure 53:
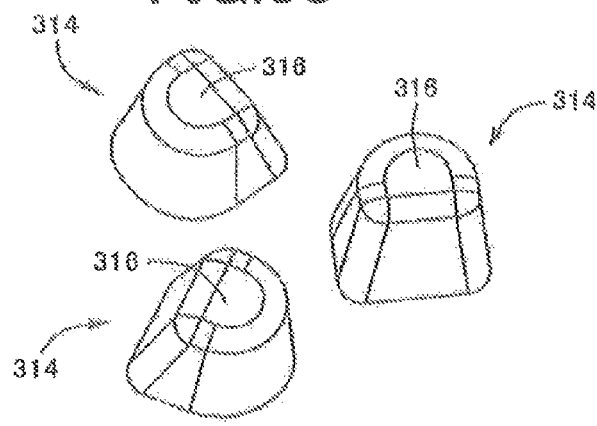
FIG. 53 is a perspective view of the small protrusions in FIGS. 51A and 51B.

A second member 310 according to the fourth modified example shown in FIGS. 51A and 51B to FIG. 53 has small protrusions 314 each having a semicircular shape in a planar view when viewed from the direction normal to a plate-like portion 312. FIG. 51A is an enlarged plan view corresponding to FIG. 24. FIG. 51B is an enlarged plan view of one of the small protrusions 314. FIG. 52 is a vertical cross-sectional view taken along the line LII-LII in FIG. 51B. FIG. 53 is a perspective view of a plurality of the small protrusions 314. Each small protrusion 314 is substantially the same as each small protrusion 304 of the second member 300 that is the product according to the embodiment, but differs from each small protrusion 304 in that no largely inclined surface 306 having an inclination angle γ is formed, the side wall on the right side, that is, the side on which the linear portion of the semicircular shape is present, in the vertical cross section shown in FIG. 52 extends to its distal end portion at an inclination angle α1, and a flat surface 316 parallel to the plate-like portion 312 is formed at the distal end. In this case as well, each small protrusion 314 is easily bent and deformed toward the left side in FIG. 51B and FIG. 52, that is, toward the side on which the circular arc of the semicircular shape is present. As in the case of the second member 300 shown in FIGS. 48A and 48B, the small protrusions 314 are arranged in such positions that the bending directions are alternately inverted, around the central axis of a corresponding one of the regular hexagons that constitute the lattice pattern 34. The dimensions a, b, R, H, t and the inclination angles α1, α2 of various portions are the same as those of each small protrusion 304 of the second member 300. The fourth modified example also corresponds to one embodiment of the invention in which bending stiffness is anisotropic around the axis of each small protrusion.

Figure 54:
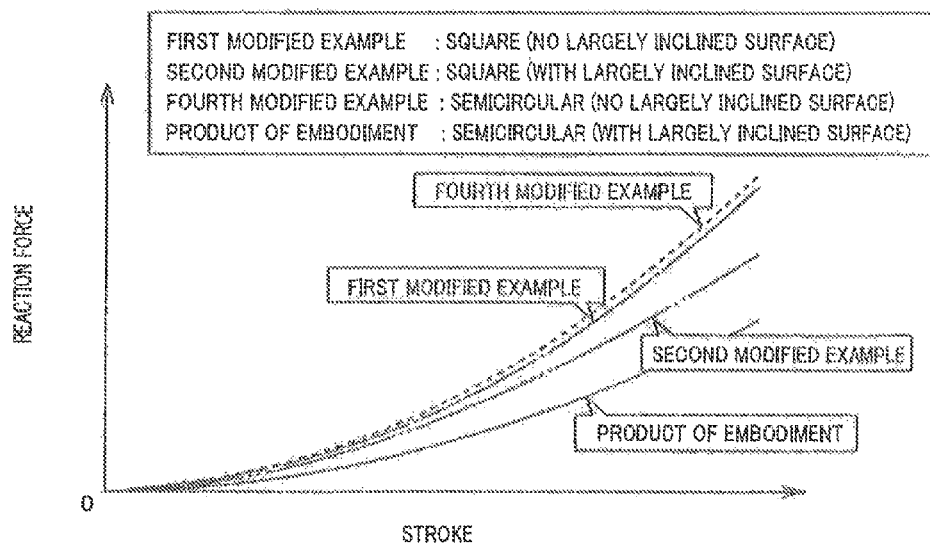
FIG. 54 is a graph that shows the results obtained by determining the correlation between the reaction force and the stroke in accordance with the testing method in FIG. 14 by using the first, second and fourth modified examples and the embodiment in FIGS. 48A and 48B.

As is apparent from the test results in FIG. 54, in the product according to the embodiment shown in FIGS. 48A and 48B, that is, the second member 300 that has the small protrusions 304 each having a semicircular shape and the largely inclined surface 306, the reaction force (bending stiffness) is lower than that in the second modified example in which the small protrusions 274 each having a square shape and the largely inclined surface 276 are formed. Therefore, an excellent soft feel is obtained. From these points of view, it is considered that, just by forming each protrusion in a semicircular shape in a planar view, each small protrusion is easily bent and deformed. As a result, the reaction force becomes lower and an excellent soft feel is obtained. The difference in reaction force between the product according to the embodiment and the product according to the fourth modified example and the difference in reaction force between the product according to the second modified example and the product according to the first modified example depend on presence or absence of the largely inclined surfaces 276, 306. Therefore, it is found that, by forming the largely inclined surface 276, 306, the reaction force becomes lower and the soft feel improves. The reaction force in the fourth modified example is higher than that in the first modified example for the following reason. The distal end of each small protrusion 264 has a semicylindrical shape (D-shape) in the first modified example as is apparent from FIG. 40 and each small protrusion 264 is brought into line contact with the base member at the initial stage of contact with the base member, whereas the distal end of each small protrusion 314 has the flat surface 316 in the fourth modified example and each small protrusion 314 is brought into plane contact with the base member from the initial stage of contact with the base member, and therefore each small protrusion 314 becomes hard to topple and the reaction force is increased.

Figure 55A:
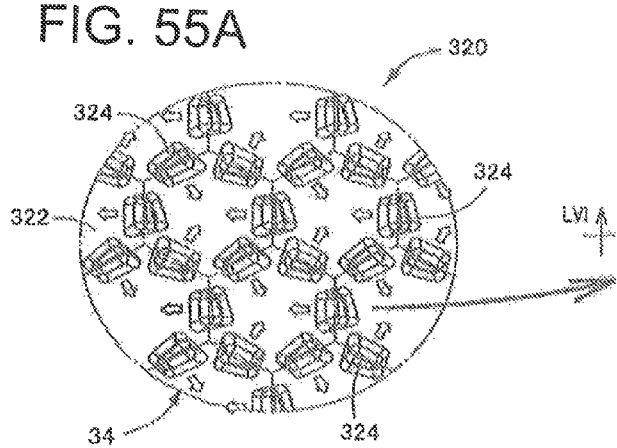
FIGS. 55A and 55B show a view that illustrates yet another embodiment of the invention in which each small protrusion has a trapezoidal shape in a planar view, in which one of sides of a square shape is inclined and a largely inclined surface is formed on a side face on the side opposite to the side on which the inclined side of the trapezoidal shape is present.
Figure 55B:
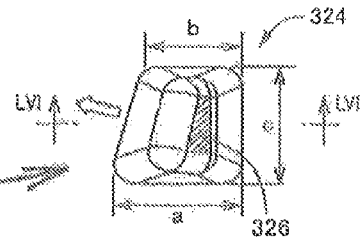
Figure 56:
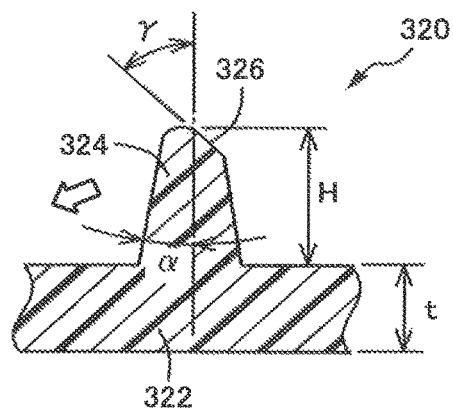
FIG. 56 is a vertical cross-sectional view taken along the line LVI-LVI in FIG. 55B.
Figure 57:
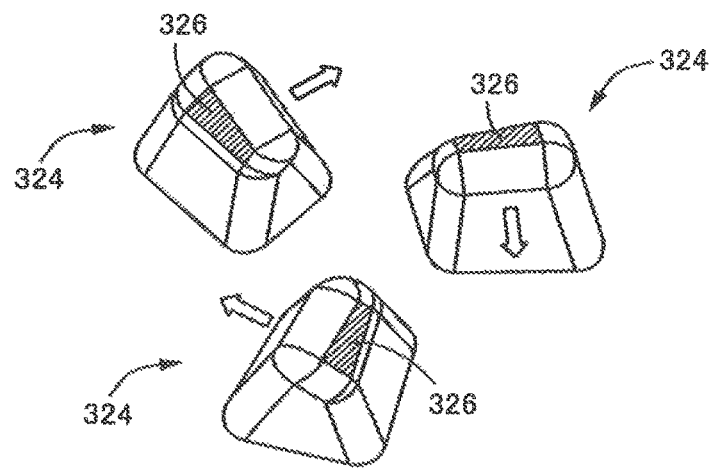
FIG. 57 is a perspective view of a plurality of the small protrusions in FIGS. 55A and 55B.

A second member 320 shown in FIGS. 55A and 55B has small protrusions 324 each having a trapezoidal shape in a planar view, in which one of sides of a square shape is inclined, when viewed from the direction normal to a plate-like portion 322. FIG. 55A is an enlarged plan view corresponding to FIG. 24. FIG. 55B is an enlarged plan view of one of the small protrusions 324. FIG. 56 is a vertical cross-sectional view taken along the line LVI-LVI in FIG. 55B. FIG. 57 is a perspective view of a plurality of the small protrusions 324. In each small protrusion 324, a largely inclined surface 326 is formed on a side face on the side opposite to the side on which the inclined side of the trapezoidal shape is present, and the stiffness against bending toward the side on which the inclined side is present, that is, the left side in FIG. 55B and FIG. 56, is made lower, and each small protrusion 324 is easily bent and deformed toward the side on which inclined side is present. Portions indicated by close oblique lines in FIG. 55B and FIG. 57 are the largely inclined surfaces 326. Outlined arrows in FIGS. 55A and 55B to FIG. 57 indicate directions in which the small protrusions 324 topple. As in the embodiment shown in FIG. 24, the small protrusions 324 are arranged in such positions that the bending directions are alternately inverted, around the central axis of a corresponding one of the regular hexagons that constitute the lattice pattern 34. Here, each small protrusion 324 is arranged in such a position that the inclined side of the trapezoidal shape is parallel to a corresponding one of the sides of each regular hexagon. The dimensions a, b, c of various portions of the trapezoidal shape are approximately 1.8 mm, approximately 1.35 mm, and approximately 1.8 mm, respectively. In addition, the height H≈2.5 mm, the thickness t≈1.5 mm, the inclination angle α of each of side walls on respective sides in the vertical cross section in FIG. 56≈10°, and the inclination angle γ of the largely inclined surface 326≈45°.

In the present embodiment as well, one small protrusion 324 is arranged on each of the sides of one of the regular hexagons that constitute the lattice pattern 34, and the small protrusions 324 are arranged in such positions that the bending directions are alternately inverted. Therefore, by arranging the small protrusions 324 as densely as possible such that the small protrusions 324 do not contact each other at the time of bending deformation, a predetermined soft feel through elastic deformation of the small protrusions 324 is reliably obtained while variations in the feel are suppressed. In addition, the deformation manner of the small protrusions 324 in the unit of hexagon is substantially the same in the entire range, and a uniform feel is obtained. Thus, similar operation and advantageous effects to those of the embodiment shown in FIG. 9 are obtained.

On the other hand, when each small protrusion 324 is formed in a trapezoidal shape in a planar view as described above, the bending stiffness is lower than that when the shape of each small protrusion in a planar view is a square shape as in the second modified example, and therefore a higher soft feel is obtained. In addition, each small protrusion 324 is easily bent and deformed in the direction perpendicular to the inclined side of the trapezoidal shape. Therefore, by adjusting the inclination angle of the inclined side, it is possible to easily control the toppling direction while obtaining an improved soft feel.

Figure 58:
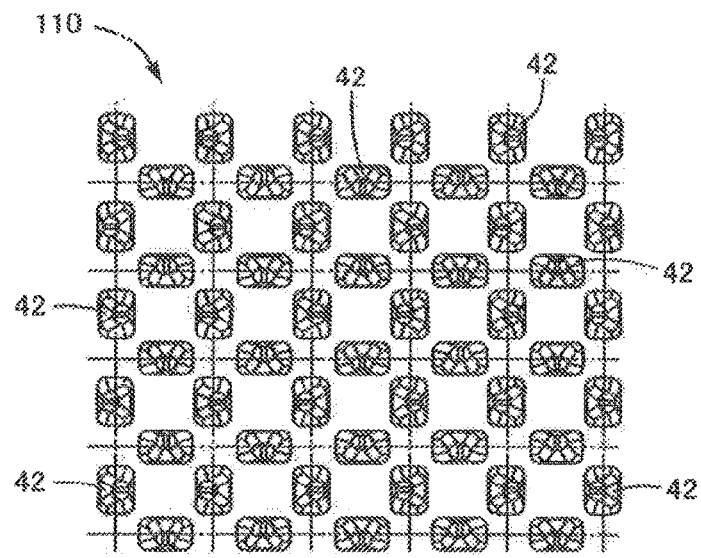
FIG. 58 is a plan view that illustrates another embodiment in which the multiple small protrusions are arranged so as to constitute a lattice pattern formed of squares.

FIG. 58 shows the case where the arrangement pattern of the small protrusions 42 is different from that in FIG. 9, and shows the case where the multiple small protrusions 42 are arranged so as to constitute a lattice pattern 110 formed of squares. One small protrusion 42 is arranged on each of the sides of a corresponding one of squares that constitute the lattice pattern 110, in such a position that the longitudinal direction of the small protrusion 42 is parallel to a corresponding one of the sides, and the small protrusions 42 are arranged in such positions that the bending directions are alternately inverted, around the center line of the corresponding one of the squares. Thus, the deformation manner of the small protrusions 42 in the unit of square is substantially the same in the entire region regardless of the fact that each small protrusion 42 is configured so as to be bent and deformed in a certain direction about its axis. Therefore, a uniform feel is obtained. That is, advantageous effects similar to those of the embodiment shown in FIG. 9 are obtained. The other small protrusions, such as the small protrusions 20, may also be arranged so as to constitute the lattice pattern 110 formed of squares as described above. In the present embodiment, the lattice pattern 110 formed of squares is described. Alternatively, the small protrusions 42 may be arranged so as to constitute a lattice pattern formed of rhombuses, a lattice pattern formed of rectangles, or a lattice pattern formed of parallelograms.

Figure 59:
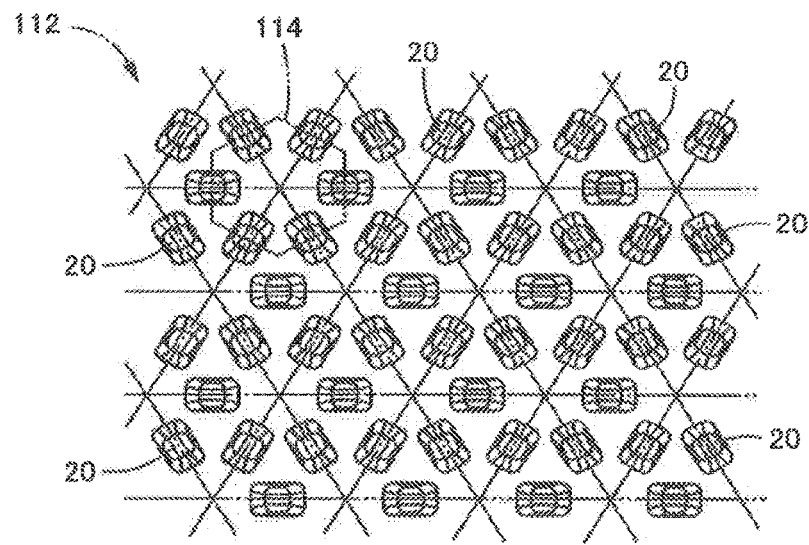
FIG. 59 is a plan view that illustrates another embodiment in which the multiple small protrusions are arranged so as to constitute a lattice pattern formed of equilateral triangles.

FIG. 59 shows the case where the arrangement of the small protrusions 20 is different from that in FIGS. 6A and 6B, and shows the case where the multiple small protrusions 20 are arranged so as to constitute a lattice pattern 112 formed of equilateral triangles. One small protrusion 20 is arranged on each of the sides of a corresponding one of the equilateral triangles that constitute the lattice pattern 112 in such a position that the longitudinal direction of the small protrusion 20 is parallel to a corresponding one of the sides. In this case as well, the multiple small protrusions 20 that are formed so as to constitute the lattice pattern 112 are arranged such that the longitudinal directions are offset from each other by a predetermined angle. Therefore, an appropriate stiff feel is obtained because the small protrusions 20 support each other. Accordingly, it is possible to set a further excellent feel by a combination of the appropriate stiff feel and the soft feel that is obtained through elastic deformation of the small protrusions 20. Therefore, similar operation and advantageous effects to those of the embodiment shown in FIGS. 6A and 6B are obtained. The other small protrusions, such as the small protrusions 42, may also be arranged so as to constitute the lattice pattern 112 formed of equilateral triangles in this way.

The lattice pattern 112 shown in FIG. 59 may be replaced with a lattice pattern in which regular hexagons 114 are consecutively repeated. In this case, the small protrusions 20 are arranged in such positions that the longitudinal direction of each small protrusion 20 is perpendicular to a corresponding one of sides of each regular hexagon 114. The lattice pattern 34 shown in FIG. 6B may also be replaced with a lattice pattern in which equilateral triangles are consecutively repeated. By shifting the pitch of each forward lattice of the lattice pattern 110 shown in FIG. 58 by a half pitch, the lattice pattern 110 shown in FIG. 58 may be replaced with a forward lattice pattern in which the small protrusions 42 are arranged on the respective forward sides in such positions that the longitudinal direction of each small protrusion 42 is perpendicular to a corresponding one of the sides.

Figure 60:
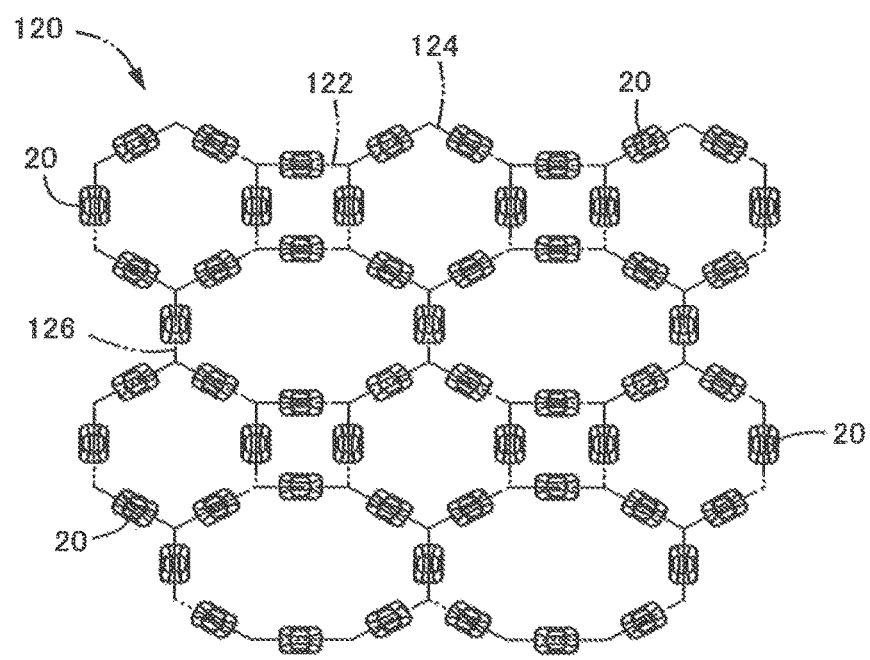
FIG. 60 is a plan view that illustrates another embodiment in which the multiple small protrusions are arranged so as to constitute a lattice pattern formed of multiple types of polygons.

A lattice pattern 120 shown in FIG. 60 is formed of a combination of three types of polygons, that is, a quadrangle (square in the drawing) 122, a hexagon (regular hexagon in the drawing) 124 and an octagon 126. Such an embodiment is also one embodiment of the invention. In the lattice pattern 120, three types of polygons are repeated in the same pattern. Alternatively, the small protrusions 20 may be formed so as to constitute a lattice pattern in which multiple types of polygons are irregularly combined with each other. Instead of the small protrusions 20, the other small protrusions, such as the small protrusions 42, may also be used.

Figure 61:
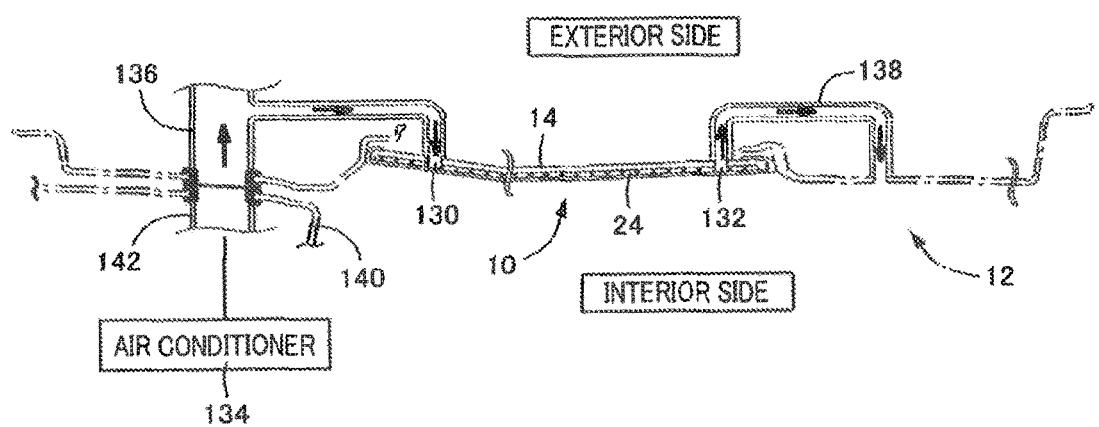
FIG. 61 is a view that illustrates the case where a heat medium is supplied by an air conditioner into the ornament in FIG. 1, and is a cross-sectional view corresponding to a cross section taken along the line LXI-LXI in FIG. 1.

FIG. 61 is a cross-sectional view corresponding to a cross section taken along the line LXI-LXI in FIG. 1. A pair of an inlet port 130 and an outlet port 132 is provided in the base member 14 of the ornament 10. A heat medium (air) of which the temperature has been adjusted by an air conditioner 134 of the vehicle is supplied from a pipe 136 into the space 24 of the ornament 10 via the inlet port 130, and is discharged from the outlet port 132 to be circulated into the vehicle interior via a tube 138 as indicated by arrows (→). The pipe 136 is allowed to be connected to or separated from a vehicle body-side pipe 142 provided in an instrument panel 140, and is airtightly connected to the pipe 142 via a seal member as shown in the drawing while the door is closed. In the present embodiment, preferably, the end portions 26 of the surface member 16 are airtightly fixed to the outer peripheral edge portions of the base member 14 by an adhesive agent, or the like.

In the present embodiment, the heat medium (air) of which the temperature has been adjusted by the air conditioner 134 is supplied into the space 24 of the ornament 10. Therefore, it is possible to further improve the feel of the surface member 16. The other ornaments, such as the ornament that includes the surface member 40, may also be configured as described above.

In FIG. 61, the heat medium is supplied into the space 24. Alternatively, compressed gas, such as compressed air, may be filled into the space 24 in advance and hermetically sealed. The surface member 16 is urged so as to bulge on the basis of the pressure of the compressed gas. Therefore, it is possible to impart an appropriate stiff feel to portions other than the small protrusions 20, thereby further improving the feel. The other ornaments may also be configured as described above. In each of the above-described embodiments, the pressure in the spaces 24, 74 is the atmospheric pressure, and the spaces 24, 74 do not need to be airtightly sealed.

The embodiments of the invention are described in detail with reference to the drawings. However, the above-described embodiments are just examples of the embodiments. The invention may be implemented in various other embodiments obtained by making modifications or improvements to the above-described embodiments on the basis of the knowledge of persons skilled in the art.

DESCRIPTION OF REFERENCE NUMERALS 10, 50, 60: ornament (laminated composite interior component, plate-like panel) 14: base member (first member) 16, 40: surface member (second member) 18, 70, 201, 211, 221, 231, 252, 262, 272, 282, 302, 312, 322: plate-like portion 20, 42, 64, 80, 90, 202, 212, 222, 232, 240, 254, 264, 274, 284, 304, 314, 324: small protrusions (protrusions) 22: surface (mating surface) 24, 74: space 34, 110, 112, 120: lattice pattern 44, 86, 92, 94, 256, 276, 306, 326: largely inclined surface 52: upholstery member 66: cushion member (second member) 68: surface member (first member) 72: back face (mating surface) 114: regular hexagon (polygon) 122: quadrangle (polygon) 124: hexagon (polygon) 126: octagon (polygon) 130: inlet port 134: air conditioner 200, 210, 220, 230, 250, 260, 270, 280, 300, 310, 320: second member 204: groove (corner shape) 214: rounded portion (corner shape) γ: inclination angle of each largely inclined surface

The invention claimed is:

1. A laminated composite interior component, including:

a first member that has a predetermined mating surface; and a second member made of an elastically deformable resin material, the second member having a plate-shaped portion that is substantially parallel to the mating surface and that has multiple protrusions which are formed integrally with the plate-shaped portion and which protrude toward the mating surface such that a space is formed between the mating surface and the plate-shaped portion, the second member being arranged so as to be laminated on the first member with the protrusions in contact with the mating surface, cushioning characteristics being imparted to the laminated composite interior component when distal ends of the protrusions are pressed against the mating surface and elastically deformed, the laminated composite interior component being configured such that the multiple protrusions have the same shape, the plate shaped portion is dotted with the multiple protrusions, the multiple protrusions are arranged at predetermined intervals on the basis of a height of each protrusion so as not to contact each other at time of bending, bending stiffness of each of the protrusions against a compression load is anisotropic around an axis of the each of the protrusions, and each of the multiple protrusions is configured to be bent in a specific direction about the axis, the multiple protrusions are arranged at such locations as to constitute all sides of multiple polygons such that each of the multiple protrusions is placed on respective one of the sides, and the multiple polygons have the same shape and the same size so that there is formed a lattice pattern in which each of the sides of each of the multiple polygons overlaps with a corresponding one of the sides of one of the multiple polygons that is adjacent to the each of the multiple polygons, and the first member is fixed at a peripheral end portion thereof to a peripheral end portion of the second member, without the distal ends of the multiple protrusions of the plate-shaped portion of the second member being bonded to the mating surface of the first member.

2. The laminated composite interior component according to claim 1, wherein the peripheral end portion of one of the first and second members is bent to include an engaged portion that is located on an opposite side of the peripheral portion of the other of the first and second members, the opposite side being opposite to the one of the first and second members, and wherein the engaged portion of the one of the first and second members is engaged with an engagement portion that is fixed to the other of the first and second members, whereby the first member is fixed at the peripheral end portion thereof to the peripheral end portion of the second member.

3. The laminated composite interior component according to claim 1, wherein the distal ends of the multiple protrusions are displaceable relative to the mating surface, upon deformation of the protrusions, thereby allowing the protrusions to be bent in respective directions.

4. The laminated composite interior component according to claim 1, wherein each of the multiple protrusions is a non-hollow member.

5. The laminated composite interior component according to claim 1, wherein each of the multiple protrusions has, in the distal end, rounded portions that are smoothly curved from side walls of the each of the multiple protrusions.

* * * * *